US010559144B2

(12) United States Patent
Spittle et al.

(10) Patent No.: US 10,559,144 B2
(45) Date of Patent: *Feb. 11, 2020

(54) SYSTEMS AND METHODS FOR ELECTRONIC TICKETING, MONITORING, AND INDICATING PERMISSIVE USE OF FACILITIES

(71) Applicant: Active8 Software, LLC, Lewisville, TX (US)

(72) Inventors: Sean Spittle, Hinckley, OH (US); Greg Spittle, Hickory Creek, TX (US); Phillip Howell, Frisco, TX (US)

(73) Assignee: Level 8 IOT, LLC, Lewisville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/156,802

(22) Filed: Oct. 10, 2018

(65) Prior Publication Data

US 2019/0096149 A1 Mar. 28, 2019

Related U.S. Application Data

(63) Continuation of application No. 15/850,204, filed on Dec. 21, 2017, now Pat. No. 10,127,747.

(Continued)

(51) Int. Cl.
*G07C 9/00* (2006.01)
*G06Q 20/10* (2012.01)
(Continued)

(52) U.S. Cl.
CPC ...... *G07C 9/00111* (2013.01); *G06K 7/10366* (2013.01); *G06Q 20/0457* (2013.01);
(Continued)

(58) Field of Classification Search
CPC ............ G07C 9/00111; G07C 9/00103; G06K 7/10366; G06Q 20/0457; G06Q 20/105;
(Continued)

(56) References Cited

U.S. PATENT DOCUMENTS 3,740,725 A 6/1973 Fletcher et al.
3,961,323 A 6/1976 Hartkorn
(Continued)

FOREIGN PATENT DOCUMENTS

JP H07-160771 A 6/1995
JP 2003-053042 A 2/2003
(Continued)

*Primary Examiner* — Emily C Terrell

(57) ABSTRACT

Systems and methods for electronic ticketing, monitoring, and indicating permissive use of facilities for family entertainment centers that implement connected terminal devices or kiosks, wireless communication networks, and a plurality of electronic wearable devices. Customers perform transactions with or without a facility employee, using the wearable device as a means of identifying the patron within the facility in addition to verifying the validity of said transactions. Systems and methods provide real-time status information regarding patrons via visual indicators embedded within wearable devices, gamification of facility attractions through an embedded motion-tracking component embedded in the wearable device, and establishment of a leaderboard' that encourages further participation by calculating and prominently displaying the top-performing customers in a facility.

29 Claims, 20 Drawing Sheets

Related U.S. Application Data

(60) Provisional application No. 62/438,050, filed on Dec. 22, 2016.

(51) Int. Cl.

| | | |
|---|---|---|
| *G06Q 20/04* | (2012.01) | |
| *G06Q 20/12* | (2012.01) | |
| *G06Q 20/20* | (2012.01) | |
| *G06K 7/10* | (2006.01) | |
| *G08B 5/36* | (2006.01) | |
| *G06Q 10/08* | (2012.01) | |
| *G06Q 20/32* | (2012.01) | |
| *G06Q 30/02* | (2012.01) | |

(52) U.S. Cl.
CPC ......... *G06Q 20/105* (2013.01); *G06Q 20/127* (2013.01); *G06Q 20/20* (2013.01); *G06Q 20/202* (2013.01); *G07C 9/00103* (2013.01); *G08B 5/36* (2013.01); *G06Q 10/087* (2013.01); *G06Q 20/325* (2013.01); *G06Q 20/3278* (2013.01); *G06Q 30/0201* (2013.01)

(58) Field of Classification Search
CPC .... G06Q 20/127; G06Q 20/20; G06Q 20/202; G06Q 10/087; G06Q 20/325; G06Q 20/3278; G06Q 30/0201; G06Q 20/40; G08B 5/36
USPC .............. 340/5.61, 5.65, 10.52, 572.1, 573.1
See application file for complete search history.

(56) References Cited

U.S. PATENT DOCUMENTS

| | | | |
|---|---|---|---|
| 5,218,344 | A | 6/1993 | Ricketts |
| 5,455,851 | A | 10/1995 | Chaco et al. |
| 5,515,419 | A | 5/1996 | Sheffer |
| 5,870,029 | A | 2/1999 | Otto et al. |
| 5,917,433 | A | 6/1999 | Keillor et al. |
| 5,956,696 | A | 9/1999 | Guryel |
| 6,052,065 | A | 4/2000 | Glover |
| 6,154,139 | A | 11/2000 | Heller |
| 6,173,153 | B1 | 1/2001 | Bittman |
| 6,198,833 | B1 | 3/2001 | Rangan et al. |
| 6,225,906 | B1 | 5/2001 | Shore |
| 6,346,886 | B1 | 2/2002 | De La Huerga |
| 6,356,802 | B1 | 3/2002 | Takehara et al. |
| 6,396,413 | B2 | 5/2002 | Hines et al. |
| 6,400,272 | B1 | 6/2002 | Holtzman et al. |
| 6,411,796 | B1 | 6/2002 | Remschel |
| 6,427,627 | B1 | 8/2002 | Huisma |
| 6,441,734 | B1 | 8/2002 | Gutta et al. |
| 6,445,297 | B1 | 9/2002 | Nicholson |
| 6,531,963 | B1 | 3/2003 | Nyfelt |
| 6,542,114 | B1 | 4/2003 | Eagleson et al. |
| 6,563,417 | B1 | 5/2003 | Shaw |
| 6,570,608 | B1 | 5/2003 | Tserng |
| 6,593,852 | B2 | 7/2003 | Gutta et al. |
| 6,633,223 | B1 | 10/2003 | Schenker et al. |
| 6,663,223 | B2 | 12/2003 | Horii et al. |
| 6,720,888 | B2 | 4/2004 | Eagleson et al. |
| 6,748,544 | B1 | 6/2004 | Challener et al. |
| 6,825,763 | B2 | 11/2004 | Ulrich et al. |
| 6,830,181 | B1 | 12/2004 | Bennett |
| 6,842,121 | B1 | 1/2005 | Tuttle |
| 6,853,294 | B1 | 2/2005 | Ramamurthy et al. |
| 6,992,566 | B2 | 1/2006 | Striemer |
| 7,034,683 | B2 | 4/2006 | Ghazarian |
| 7,040,435 | B1 | 5/2006 | Lesesky et al. |
| 7,092,669 | B2 | 8/2006 | Sakai et al. |
| 7,195,159 | B2 | 3/2007 | Sloan et al. |
| 7,212,650 | B2 | 5/2007 | Sumi |
| 7,221,276 | B2 | 5/2007 | Olsen, III et al. |
| 7,262,696 | B2 | 8/2007 | Aota et al. |
| 7,267,262 | B1 | 9/2007 | Brown |
| 7,319,412 | B1 | 1/2008 | Coppinger et al. |
| 7,327,251 | B2 | 2/2008 | Corbett, Jr. |
| 7,502,619 | B1 | 3/2009 | Katz |
| 7,812,779 | B2 | 10/2010 | Turner et al. |
| 8,250,796 | B2 | 8/2012 | Padgett et al. |
| 8,590,192 | B2 | 11/2013 | Padgett et al. |
| 8,776,418 | B1 | 7/2014 | Martinez et al. |
| 8,919,019 | B2 | 12/2014 | Martinez et al. |
| 8,961,413 | B2 | 2/2015 | Teller et al. |
| 9,073,671 | B2 | 7/2015 | Martinez et al. |
| 9,110,498 | B2 | 8/2015 | Martinez et al. |
| 9,141,951 | B2 | 9/2015 | McNeal |
| 9,204,693 | B2 | 12/2015 | Sunne et al. |
| 9,368,865 | B2 | 6/2016 | Backman et al. |
| 9,589,264 | B2 * | 3/2017 | Deliwala .............. G06F 16/9554 |
| 2002/0002477 | A1 | 1/2002 | Fox et al. |
| 2002/0030582 | A1 | 3/2002 | Depp et al. |
| 2002/0041234 | A1 | 4/2002 | Kuzma et al. |
| 2002/0070859 | A1 | 6/2002 | Gutta et al. |
| 2002/0070862 | A1 | 6/2002 | Francis et al. |
| 2002/0082897 | A1 | 6/2002 | Menelly et al. |
| 2002/0089434 | A1 | 7/2002 | Ghazarian |
| 2002/0171736 | A1 | 11/2002 | Gutta et al. |
| 2002/0178038 | A1 | 11/2002 | Grybas |
| 2002/0183979 | A1 | 12/2002 | Wildman |
| 2002/0192631 | A1 | 12/2002 | Weir et al. |
| 2003/0001722 | A1 | 1/2003 | Smith |
| 2003/0074281 | A1 | 4/2003 | Hoffman et al. |
| 2003/0112155 | A1 | 6/2003 | Landre et al. |
| 2003/0167193 | A1 | 9/2003 | Jones et al. |
| 2003/0197607 | A1 | 10/2003 | Striemer |
| 2004/0066276 | A1 | 4/2004 | Gile et al. |
| 2004/0140899 | A1 | 7/2004 | Bouressa |
| 2004/0212500 | A1 | 10/2004 | Stilp |
| 2004/0249250 | A1 | 12/2004 | McGee et al. |
| 2005/0071234 | A1 | 3/2005 | Schon |
| 2005/0078006 | A1 | 4/2005 | Hutchins et al. |
| 2005/0187677 | A1 | 8/2005 | Walker |
| 2005/0244803 | A1 | 11/2005 | Brown et al. |
| 2006/0022796 | A1 | 2/2006 | Striemer |
| 2006/0111053 | A1 | 5/2006 | Wu et al. |
| 2006/0164259 | A1 | 7/2006 | Winkler et al. |
| 2006/0181413 | A1 | 8/2006 | Mostov |
| 2006/0219783 | A1 | 10/2006 | Willis |
| 2006/0243174 | A1 | 11/2006 | Muirhead |
| 2007/0001809 | A1 | 1/2007 | Kodukula et al. |
| 2007/0120687 | A1* | 5/2007 | Lerch .................... G06K 19/04 |
| | | | 340/572.9 |
| 2007/0222595 | A1 | 9/2007 | Motteram et al. |
| 2007/0229217 | A1 | 10/2007 | Chen et al. |
| 2007/0247359 | A1 | 10/2007 | Ghazarian |
| 2010/0295687 | A1 | 11/2010 | Kuzniar et al. |
| 2010/0321325 | A1 | 12/2010 | Springer et al. |
| 2012/0324773 | A1 | 12/2012 | Padgett et al. |
| 2013/0018661 | A1 | 1/2013 | Padgett et al. |
| 2013/0018684 | A1 | 1/2013 | Padgett et al. |
| 2013/0127616 | A1 | 5/2013 | Robitaille |
| 2013/0140193 | A1 | 6/2013 | Pedicano et al. |
| 2014/0027521 | A1 | 1/2014 | Pedicano et al. |
| 2014/0122170 | A1 | 5/2014 | Padgett et al. |
| 2014/0122263 | A1 | 5/2014 | Padgett et al. |
| 2014/0174958 | A1 | 6/2014 | Martinez et al. |
| 2015/0206045 | A1* | 7/2015 | Gazdzinski ............ G06Q 10/08 |
| | | | 235/492 |
| 2015/0214613 | A1 | 7/2015 | Backman et al. |

FOREIGN PATENT DOCUMENTS

| | | |
|---|---|---|
| JP | 2003-132435 A | 5/2003 |
| JP | 2003-141268 A | 5/2003 |
| JP | 2003-144760 A | 5/2003 |
| JP | 2003-150838 A | 5/2003 |
| JP | 2003-150852 A | 5/2003 |
| JP | 2003-305271 A | 10/2003 |
| WO | 2015/094540 A1 | 6/2015 |

* cited by examiner

| Leaderboard 8001 | | | | |
|---|---|---|---|---|
| Rank 8003 | Name 8004 | Total Jumps | Time Jumping 8005 | Score 8006 |
| 1 _8007_ | Joe _8008_ | 3257 _8009_ | 4:33:07 _8010_ | 53478 _8011_ |
| 2 | Mary | 2344 | 3:13:44 | 46854 |
| 3 | Steve | 1988 | 2:45:51 | 41558 |
| 4 | Aaron | 1554 | 1:57:33 | 35541 |

FIG. 18

SYSTEMS AND METHODS FOR ELECTRONIC TICKETING, MONITORING, AND INDICATING PERMISSIVE USE OF FACILITIES

CROSS REFERENCE TO RELATED APPLICATIONS

This application is a Continuation of U.S. Utility patent application Ser. No. 15/850,204, filed on Dec. 21, 2017, which claims the benefit of priority from U.S. Provisional Patent Application No. 62/438,050, filed on Dec. 22, 2016, the entirety of which are hereby incorporated by reference.

BACKGROUND

The present disclosure relates generally to the design and implementation of a wireless control system for monitoring customer use of and providing individualized visual indications of permitted access to areas at a Family Entertainment Center (FEC). FECs are an established industry, typically housed within an indoor facility and comprising various forms of attractions for customers and marketed towards families with teenagers and young children. In a typical FEC, customers purchase credits (often in the form of tokens or tickets) in exchange for access to a specified feature, device, or attraction.

For the purpose of the following disclosure, it is useful to apportion credits into three distinct categories: quantity-based, time-based, and monetary-based. As an example, quantity-based credits may take the form of tokens or tickets, where a single such credit is exchanged for a one-time usage of an arcade or video game (or similar apparatus) within the facility. A time-based credit can be exemplified by purchasing a single 'ticket' or credit that grants a customer access to the facility or specific portion thereof for a defined quantity of time. One such example is the purchase of a pass to gain access to a playground or ball pit for a set amount of time. Monetary-based credits can be thought of in the more general sense as a gift card. That is, monetary-based credits denote a given amount of money or currency whose redemption is limited to the confines of the facility. As defined within this context, monetary-based credits can be exchanged for quantity-based or time-based credits.

A recent development in the nature of facilities is the advent of trampoline parks, which are considered a subset of the larger FEC industry. Within these facilities, customers purchase "jump time" or "jump tickets" to gain access to the "jump deck," which is comprised of a plurality of trampolines in various configurations. Jump tickets are purchased in distinct time increments—that is, a single ticket grants access to the jump deck for a fixed time interval as determined at the time of purchase. In this way, jump tickets function as time-based credits as discussed previously. Typically, management of which customers are currently allowed access to the jump deck is facilitated by the use of colored wristbands or bracelets, whereby the color of the wristband denotes during which time interval a given customer is allowed access. These wristbands and/or bracelets are typically made primarily of paper or a similar disposable medium.

It is well known to those familiar with the industry that the existing paper wristband system imposes several limitations and drawbacks. Firstly, use of such a system requires that jump tickets be allotted in time increments that correspond to set time blocks across the facility. As an example, a facility may offer jump tickets in one-hour increments that begin on the hour. If a customer purchases a jump ticket any other time than at the top of the hour, they may be forced to wait until the subsequent time block. Alternatively, he or she may be given additional access beyond what was purchased (if he/she is granted access prior to their allotted time block).

Within trampoline parks and FECs more generally, certain portions of, or attractions within, the facility may require a legal waiver or another form of eligibility requirement (e.g. minimum age to participate in a go-kart course) to access. As such, many facilities permanently store customer information regarding his or her waiver status, age, and other relevant information.

Successful operation of an FEC requires accurate management of a wide variety of aspects, including selling and redeeming tickets to various attractions, maintaining and operating arcade games, redeeming tickets for prizes, and managing and monitoring customer use of all portions of the facility. The incongruous nature of all of these aspects poses a challenge in the creation of a comprehensive Point of Sale (POS) system that can manage all of these characteristics.

In a typical use case, customers purchase physical tokens that are in turn redeemable at individual devices or attractions. For FECs with arcade games, it is common to find what are called 'redemption games,' which dispense tickets back to the customer proportionally to the score achieved. These tickets are redeemable for prizes at a central location within the facility. This existing method poses several disadvantages. Firstly, a facility manager must constantly monitor the number of tokens available and ensure that each of the redemption machines has sufficient tickets at all times. Secondly, using paper redemption tickets creates considerable waste and incurs additional operating costs, as the tickets are redeemed and can no longer be used within the machines.

In recent years, a growing number of FECs have been moving to paperless credit management systems, Sacoa™ and Embed™ being among the popular options. In such systems, customers are typically issued a passive RFID card that acts as an intermediary device to store the number of tokens and redemption tickets a customer has purchased or earned. In this way, the RFID cards function similarly to debit cards. While this certainly has advantages over traditional paper-based ticket system, it too has its shortcomings: (1) cards can be easily lost. (2) cards can only provide information to the user when swiped at a kiosk/terminal. (3) cards don't store waiver information or other patron status information. (4) such systems do not provide any externally accessible information to FEC Staff or employees regarding the status of the customer. (5) Such systems are not inherently integrated into the POS system used to conduct transactions.

To ameliorate the shortcomings of current state-of-the-art POS systems, the present disclosure describes a comprehensive POS system to be used by FECs, which further provides the following novel and useful features and functions:

An electronic device worn by a customer that is capable of providing real-time status information regarding his or her account through the use of visual indicators embedded within the wearable device. Status information may include previously purchased tickets to attractions that are able to be redeemed, the number of earned points or prize tickets to date, or additional information such as emergency messages.

The same wearable device as above that further displays visual information to FEC Staff, allowing Staff members to easily ascertain the status of a customer from a distance.

A means of 'gamifying' attractions in a configurable way within the facility. That is, the system and wearable devices provide the means and methods by which customers can earn points by participating in attractions within the facility, and/or achieving certain activity metrics while participating in said attractions.

The gamification methods described above that may be further adapted to conglomerate the obtained activity information data for marketing analysis or more general data collection purposes A means of calculating and displaying a facility 'leaderboard,' which displays the most active or highest achieving customers in the facility. Those customers at the top of the leaderboard are determined by a composite score, calculated as a combination or aggregation of achieved activity metrics or points earned via the gamification method(s) described herein.

SUMMARY

To ameliorate the shortcomings described above, the present disclosure describes a system and associated methods by which an FEC can manage customer usage of a facility through the use of electronic wearable devices that communicate with a plurality of remote devices placed throughout a facility via a shared software system and wireless communication protocol. Namely, management of customers is facilitated by conducting financial transactions within the facility using wearable devices, and a Mobile Point of Sale (MPOS) system with terminal devices provided throughout the facility. Moreover, the system and methods provided include a method of relaying a patron's status simultaneously and in real time to the customer and facility staff members through visual indicators integrated into the wearable device.

In one embodiment, an electronic wearable device is provided comprising an external housing or enclosure that contains the inner components of the wearable device, an Integrated Circuit (IC) that provides wireless communication capabilities such as LoRaWAN™, Bluetooth™, Bluetooth Low Energy™ (BLE), or a similar standardized wireless communication protocol, one or more visual indicators contained within the external housing that are visible to the human eye from outside the external housing, an oscillator or another timer for accurately recording elapsed time, and a passive RFID tag or other means of uniquely identifying a given wearable device through the use of a separate wireless transponder or interrogator that communicates with the wearable device. The passive RFID tag acts only as a means of uniquely identifying a given wearable device, while the additional novel functionality provided by the system is facilitated via the two-way wireless communication network described above.

Further, the wearable devices may act as controller and identifier linked to an account tracking the amount of available credit or credits pertaining to a unique individual.

In one embodiment, a wireless control system for use with the wearable devices is provided. The control system provides a system and method whereby customers can conduct transactions through a plurality of MPOS terminals placed throughout the facility to perform the following functions: purchase credits (whether time-based, quantity-based, or monetary-based) for use within the facility, and ascertain the status of his or her account (i.e., available credits or status thereof).

The system is further comprised of a central database server that serves the following functions: temporarily or persistently uniquely associates a customer with a given wearable device, and persistently stores customer information regarding credits available for use within the facility, or alternatively the amount of monetary-based credits available for use by that account, as well as persistently stores customer activity and/or data related to the interaction with the store attractions, including both active and passive interactions.

In one embodiment, the MPOS terminals or terminal devices may establish a communication link to the server via a primary wireless network such as the internet, or a secondary wireless network using radio waves.

More specifically, one embodiment of the MPOS terminals may comprise: a visual display that communicates information to the customer: products or credits available for purchase, and the status of said customer's account, a wireless transceiver for communicating with the wearable devices, an external housing for protecting the display and for mounting purposes, and an external peripheral device for uniquely identifying a given wearable device. In an exemplary embodiment, this external peripheral device may comprise an RFID transponder, but those skilled in the art will realize that other means of uniquely identifying a single wearable device could potentially be used.

In an alternative embodiment, the MPOS terminals may be integrated into an existing device or apparatus within the facility. In such an embodiment, the MPOS is associated with a single product or credit type and may or may not contain a visual display. As an example, such a terminal may be affixed or otherwise integrated into an existing video game and/or arcade machine such that conducting a transaction with that terminal will only allow the purchase of a credit redeemable only for that specific device.

Furthermore, the method of conducting transactions provided herein include the steps of: temporarily or permanently issuing a wearable device to a customer for the purpose of uniquely identifying said customer within the facility, associating the issued wearable device to a specific customer within the central database, selecting product(s) or credit(s) to purchase from the plurality of MPOS stations contained within the facility, interrogating the wearable device by a wireless transponder contained within the MPOS station to ascertain the identity of the patron and his or her account, communicating between the MPOS terminal and the central database server to validate the purchase via an HTTP request or similar method, generating an acknowledgement message from the central database to the MPOS regarding the validity of the purchase, and displaying the status of the purchase to the customer. Following the completion of this process, the MPOS terminal may further communicate wirelessly with the wearable device to alter the status of the visual indicators contained within the wearable device to reflect the status or quantity of available credits in accordance with the nature of the performed transaction.

Particular embodiments of the current disclosure include a networked system comprising a plurality of wearable electronic devices, where each of the plurality of wearable electronic devices comprises a wireless network adapter, a visual indicator having a state, and a wirelessly readable identification tag, and one or more processors executing programming logic; a plurality of terminals, where each of the plurality of terminals comprises a visual display, a user interface, a wireless identification tag reader, a network adapter, and one or more processors executing programming logic; and an apparatus comprising a network adapter and one or more processors executing programming logic; where the programming logic of each of the plurality of terminals is configured to: receive identification data from the wireless identification tag reader; receive user input data from the user interface; send the identification data and user input data to the apparatus via the network adapter; receive response data from the apparatus via the network adapter; and display a message to a user through the visual display; where the programming logic of the apparatus is configured to: receive the identification data and the user input data from one of the plurality of terminals via the network adapter of the apparatus; determine an account associated with the RFID data; process a transaction utilizing the user input data; send transaction data to the one of the plurality of terminals via the network adapter of the apparatus; send status data to the wearable device via the network adapter of the apparatus; where the programming logic of each of the plurality of wearable devices is configured to: receive status data from the apparatus via the respective network adapter of the respective wearable device; and alter the state of the visual indicator. Each of the plurality of wearable electronic devices further comprises an accelerometer. The programming logic of each of the wearable devices is further configured to: receive movement data from the accelerometer; and send the movement data to the apparatus via the network adapter of the respective wearable device. The programming logic of the apparatus is further configured to: receive movement data from at least one of the plurality of wearable devices via the networked adapter of the apparatus. The plurality of wearable electronic devices further comprises a timer. The timer of each of the plurality of wearable electronic devices is an oscillator. The programming logic of each of the plurality of wearable devices is further configured to wait a period of time specified by the status data before altering the state of the visual indicator. The system further comprises a primary network and a secondary network, where the secondary network is a wireless network; where the wireless network adapter of each of the plurality of wearable electronic devices communicates with the secondary network, where the network adapter of each of the plurality of terminals communicates with the primary network. The primary network is a wireless network. The network adapter of the apparatus communicates with the primary network. The network adapter of each of the plurality of terminals is a wireless network adapter. The apparatus is a plurality of computer servers. The state of the visual indicator of each of the plurality of wearable electronic devices is a color produced by the visual indicator. The visual indicator of each of the plurality of wearable electronic devices is a liquid crystal display screen. The state of the visual indicator of each of the plurality of wearable electronic devices is a message displayed on the liquid crystal display screen. The programming logic of the apparatus is further configured to validate whether there is sufficient inventory or capacity to process the transaction. The networked system further comprises a gateway, where the gateway relays data payloads from the primary network to the secondary network and from the secondary network to the primary network. The status data comprises a duration of time. The wirelessly readable identification tag is a radio-frequency identification tag.

Additional embodiments of the current disclosure include a networked system comprising a plurality of wearable electronic devices, where each of the plurality of wearable electronic devices comprises a wireless network adapter, a visual indicator having a state, and a wirelessly readable identification tag, and one or more processors executing programming logic; a plurality of terminals, where each of the plurality of terminals comprises a user interface, a wireless identification tag reader, a network adapter, and one or more processors executing programming logic; and an apparatus comprising a network adapter and one or more processors executing programming logic; where the programming logic of each of the plurality of terminals is configured to: receive identification data from each of the plurality of wearable electronic devices using the wireless identification tag reader; receive user input data from the user interface; send the identification data and user input data to the apparatus via the network adapter; where the programming logic of the apparatus is configured to: receive the identification data and the user input data from one of the plurality of terminals via the network adapter of the apparatus; determine an account associated with the identification data; process a transaction associated with the identification data utilizing the user input data; send status data to the wearable device via the network adapter of the apparatus; where the programming logic of each of the plurality of wearable devices is configured to: receive status data from the apparatus via the respective network adapter of the respective wearable device; and alter the state of the visual indicator. Each of the plurality of wearable electronic devices further comprises an accelerometer. The programming logic of each of the wearable devices is further configured to: receive movement data from the accelerometer; and send the movement data to the apparatus via the network adapter of the respective wearable device. The programming logic of the apparatus is further configured to: receive movement data from at least one of the plurality of wearable devices via the networked adapter of the apparatus. The plurality of wearable electronic devices further comprises a timer. The timer of each of the plurality of wearable electronic devices is an oscillator. The programming logic of each of the plurality of wearable devices is further configured to wait a period of time specified by the status data before altering the state of the visual indicator. The system further comprises a primary network and a secondary network, where the secondary network is a wireless network; where the wireless network adapter of each of the plurality of wearable electronic devices communicates with the secondary network, where the network adapter of each of the plurality of terminals communicates with the primary network. The primary network is a wireless network. The network adapter of the apparatus communicates with the primary network. The network adapter of each of the plurality of terminals is a wireless network adapter. The apparatus is a plurality of computer servers. The state of the visual indicator of each of the plurality of wearable electronic devices is a color produced by the visual indicator. The visual indicator of each of the plurality of wearable electronic devices is a liquid crystal display screen. The state of the visual indicator of each of the plurality of wearable electronic devices is a message displayed on the liquid crystal display screen. The programming logic of the apparatus is further configured to validate whether there is sufficient inventory or capacity to process the transaction. The networked system further comprises a gateway, where the gateway relays data payloads from the primary network to the secondary network and from the secondary network to the primary network. The status data comprises a duration of time. The wirelessly readable identification tag is a radio-frequency identification tag.

Other embodiments of the current disclosure include a networked arrangement of devices comprising a plurality of wearable electronic devices, where each of the plurality of wearable electronic devices comprises a wireless network adapter, a visual indicator having a state, an accelerometer and a radio-frequency identification (RFID) tag, and one or more processors executing programming logic; a plurality of terminals, where each of the plurality of terminals comprises a visual display, a user interface, an RFID reader, a network adapter, and one or more processors executing programming logic; a server system comprising a network adapter and one or more processors executing programming logic; a primary network; and a secondary network, where the secondary network is a wireless network; where the wireless network adapter of each of the plurality of wearable electronic devices communicates with the secondary network, where the network adapter of each of the plurality of terminals communicates with the primary network; where the programming logic of each of the plurality of terminals is configured to: receive RFID data from the RFID reader; receive user input data from the user interface; send the RFID data and user input data to the server system via the network adapter; receive response data from the server system via the network adapter; and display a message to a user through the visual display; where the programming logic of the server is configured to: receive the RFID data and the user input data from one of the plurality of terminals via the network adapter of the server system; determine an account associated with the RFID data; process a transaction utilizing the user input data; send transaction data to the one of the plurality of terminals via the network adapter of the server system; send status data to the wearable device via the network adapter of the server system; where the programming logic of each of the plurality of wearable devices is configured to: receive status data from the server system via the respective network adapter of the respective wearable device; and wait a period of time specified by the status data and then alter the state of the visual indicator; receive movement data from the accelerometer; and send the movement data to the server system via the network adapter of the respective wearable device. The programming logic of the server system is further configured to: receive movement data from at least one of the plurality of wearable devices via the networked adapter of the server system. The server system comprises a plurality of computer servers. The state of the visual indicator of each of the plurality of wearable electronic devices is a color produced by the visual indicator. The network arrangement further comprises a gateway, where the gateway relays data payloads from the primary network to the secondary network and from the secondary network to the primary network.

Further embodiments of the current disclosure include a method of providing a visual indication of permission for a user to access an area comprising the steps of: reading identification data from a wearable device secured to a user; receiving user input data from a user interface of a terminal; sending the identification data and user input data from the terminal to a server system over a primary network; determining an account associated with the identification data; processing a transaction utilizing the user input data and the account; sending status data to the wearable device over a secondary wireless network; and altering a visual indicator of the wearable device to indicate permission to access an area. The method further comprises the steps of: receiving movement data from the wearable device; calculating a score using the movement data from the wearable device; and displaying a ranking of users. The step of altering a visual indicator of the wearable device comprises display a message on a display screen of the wearable device.

These and other advantages of the invention will be further understood and appreciated by those skilled in the art by reference to the following written specification, claims and appended drawings.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. Furthermore, the use of plurals can also refer to the singular, including without limitation when a term refers to one or more of a particular item; likewise, the use of a singular term can also include the plural, unless the context dictates otherwise.

The presence of broadening words and phrases such as "one or more," "at least," "but not limited to" or other like phrases in some instances shall not be read to mean that the narrower case is intended or required in instances where such broadening phrases may be absent. Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

BRIEF DESCRIPTION OF DRAWINGS

FIG. 18 shows a display view of a park 'leaderboard,' which prominently displays the most-active or highest-achieving customers within the facility over a period of time according to selected embodiments of the current disclosure.

DETAILED DESCRIPTION

Figure 1:
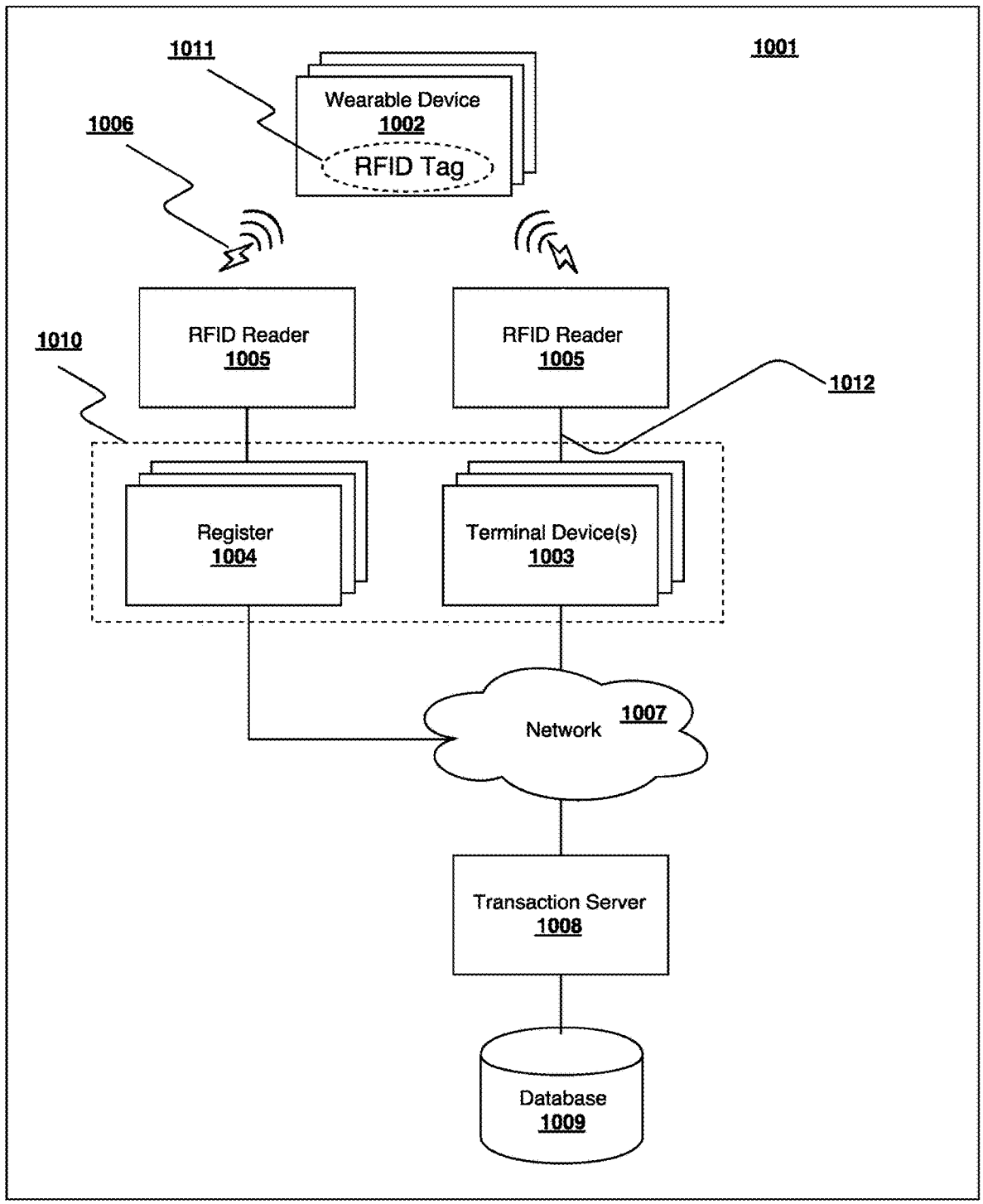
FIG. 1 is a diagram showing system components according to selected embodiments of the current disclosure.

It is to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Further, the invention presented herein may be described in terms of functional block components and processes, which may be realized in a variety of different forms to perform the specified functions and processes.

In one embodiment of the invention, the following components are employed:

A plurality of electronic wearable devices, which including the following components: (1) a microcontroller integrated circuit (IC) such as the ATMEGA328-AUR by Atmel, Inc. or EFM32TG110F32-QFN24 by Silicon Labs, (2) A wireless radio transponder IC such as the SX1257 or SX1301 from Semtech, (3) a rechargeable battery, (4) a means of recharging the said battery, possibly through wireless means such as 760308101208 by Wurth Electronics and the NXQ1TXH5/101J by NSP Semiconductors. (5) an accelerometer or motion-sensing device such as the BMA250E 3-Axis accelerometer by Bosch Sensortec or the ADXL344ACCZ-RL7 by Analog Devices, (5) a non-volatile semiconductor memory unit such as the SST25VF010A by Microchip, Inc., the AT25XV041B-MHV-T by Adesto Technologies, (6) visual indicators which can include the following: (a) LEDs/photodiodes such as the LTRBGFSF-ABCB-QKYO-Z from OSRAM Opto Semiconductors Inc., or QBLP679E-RGB from QT Brightek, (b) an LED or OLED screen such as CFAL12864N-A-B4 by Crystalfontz America Inc., (7) a tactile user interface such as the 7914J-1-024E by Bourns, Inc., or similar device, (8) an analog-to-digital converter chip such as the AD7999YRJZ-1500RL7 by Analog Devices, Inc. or the ADS1015IRUGR by Texas Instruments, Inc., and (9) a passive Radio Frequency Identifier (RFID) tag.

A plurality of terminal devices, in one embodiment comprising: (1) an iPad, Android tablet, personal computer, or similar device, (2) an external RFID reader such as the HF RFID Mifare IC Card Reader by Mifare Inc., the Chafon CF-RS103 125 KHz RFID ID Card Reader by Chafon, Inc., or similar device, and (3) in some embodiments, an external user input device such as a numeric keypad.

Said terminal devices, in another embodiment, comprising: (1) a microcontroller integrated circuit (IC) such as the ATMEGA328-AUR by Atmel, Inc. or EFM32TG110F32-QFN24 by Silicon Labs, (2) A wireless radio transponder IC such as the SX1257 or SX1301 from Semtech, (3) a visual display screen such as the CFAH1602D-YYH-ET or the CFAG12232J-TMI-TA from Crystalfontz America, Inc., or similar device, (3) an external RFID reader such as the HF RFID Mifare IC Card Reader by Mifare Inc., the Chafon CF-RS103 125 KHz RFID ID Card Reader by Chafon, Inc., or similar device.

A series of wireless network 'gateway' devices capable of communicating across multiple wireless networks, such as the MultiTech MultiConnect Conduit by MultiTech, Inc., or the LL-BST-8 LoRa Gateway by Link Labs, Inc.

A leaderboard' display, in one embodiment comprising (1) an LCD panel or series of panels such as the Clarity Matrix MX(c) offered by Planar, Inc., (2) a device capable of connecting to the internet or similar wireless network and subsequently outputting a video signal to the display. This may comprise a tablet, laptop, or personal computer that is extends or mirrors a displayed web page through a physical cable link, or a wireless network adapter with HDMI output such as the Nyrius Pro Wireless HDMI Transmitter & Receiver by Nyrius, Inc. or similar device.

The leaderboard display described above, in another embodiment, comprising a 'Smart TV' such as the UN58J5190AFXZA by Samsung, Inc., whereby the Smart TV inherently contains a wireless network adapter and is capable of displaying a webpage without additional components.

To better illustrate the advantages provided by the current disclosure, it may be helpful to describe in further detail the nature of FECs. Generally, the available attractions can be broken into several rough categories. First, many FEC attractions are located in a distinct part of the park, and require a ticket or the like to gain access to the area for either a certain amount of time (i.e., purchasing an hour of time in the jump deck of a trampoline park, or purchasing a ticket for 10 minutes on the go-karts), or for a certain number of iterations (i.e., purchasing one round of mini-golf). Each ticket is worth a certain number of units of measure of each attraction or product (an hour in the roller-skating rink, one round in the batting cages). After purchasing the ticket, the customer redeems the ticket or "checks in" to consume the attraction for the specified units of measure. For the purposes of the present disclosure, these types of tickets will be collectively referred to as "pass tickets." In some cases, attractions become open or available at defined times (i.e., laser tag games may start on the half hour), while others can be accessed at any time provided capacity is available (the rock wall can be climbed as long there is an open lane). To facilitate explanation of the subsequent processes disclosed herein, the former are classified as "scheduled pass tickets," while the latter are classified as "immediate pass tickets." Additionally, many FECs contain video game arcade machines, pinball machines, etc. Customers insert a certain number of tokens to activate the machine, and in many cases, the machine, in turn provides tickets based on the customer's score or achievement. These tickets are then redeemable for prizes. Use of these machines can be classified as the purchase of an "immediate pass ticket" whose unit of measure is the number of tokens required to play one iteration of the game. Again for the purpose of the present disclosure, the aforementioned machines will be collectively referred to as "arcade games," and the redeemable tickets they may issue will be referred to as "prize tickets."

The system according to selected embodiments is comprised of a plurality of terminal devices that interact with a web-based transaction server through a wireless network to conduct transactions and perform other functions. The system is additionally comprised of a plurality of electronic wearable devices worn by individual customers that likewise interact with terminal devices to perform various functions provided by the system.

System Overview (1001): One embodiment provides the device and methods of conducting transactions within a Family Entertainment Center (FEC) facility and provides the components and methods required to allow simultaneous, real-time tracking of each customer's status within the facility. The system also gamifies transactions to increase user participation and retention. Referring to FIG. 1, the system comprises: (1) a database (1009) hosted on a web server that persistently stores customer account information (i.e., customer information and their status with regards to products purchased and the status of said purchases), (2) a plurality of terminal devices (1003) placed throughout the facility through which customers can conduct financial transactions such as purchasing tickets or concessions, (3) a plurality of electronic wearable devices worn by individual customers that uniquely identify a given customer within the facility (1002). The electronic wearable devices (1002) can also relay information to a customer regarding their current account status, including but not limited to previously purchased products (2002 in FIG. 4), whether or not products have yet been redeemed, and the number of prize tickets redeemable at the facility. Furthermore, the wearable devices serve the additional purpose of displaying visual information to FEC Staff members that allow them to easily discern the status of the customer from a distance. Such a feature is particularly useful in a trampoline park, for example, where Staff members are responsible for removing customers from the trampoline area or jump deck once his or her ticket has expired. With paper wristbands and other current methods of managing this process, whether or not a customer has a valid ticket is not always easy to determine. In the context of the current disclosure, the terminal devices (1003) and wearable devices (1002) are referred to as 'endpoints' within the system.

Figure 2:
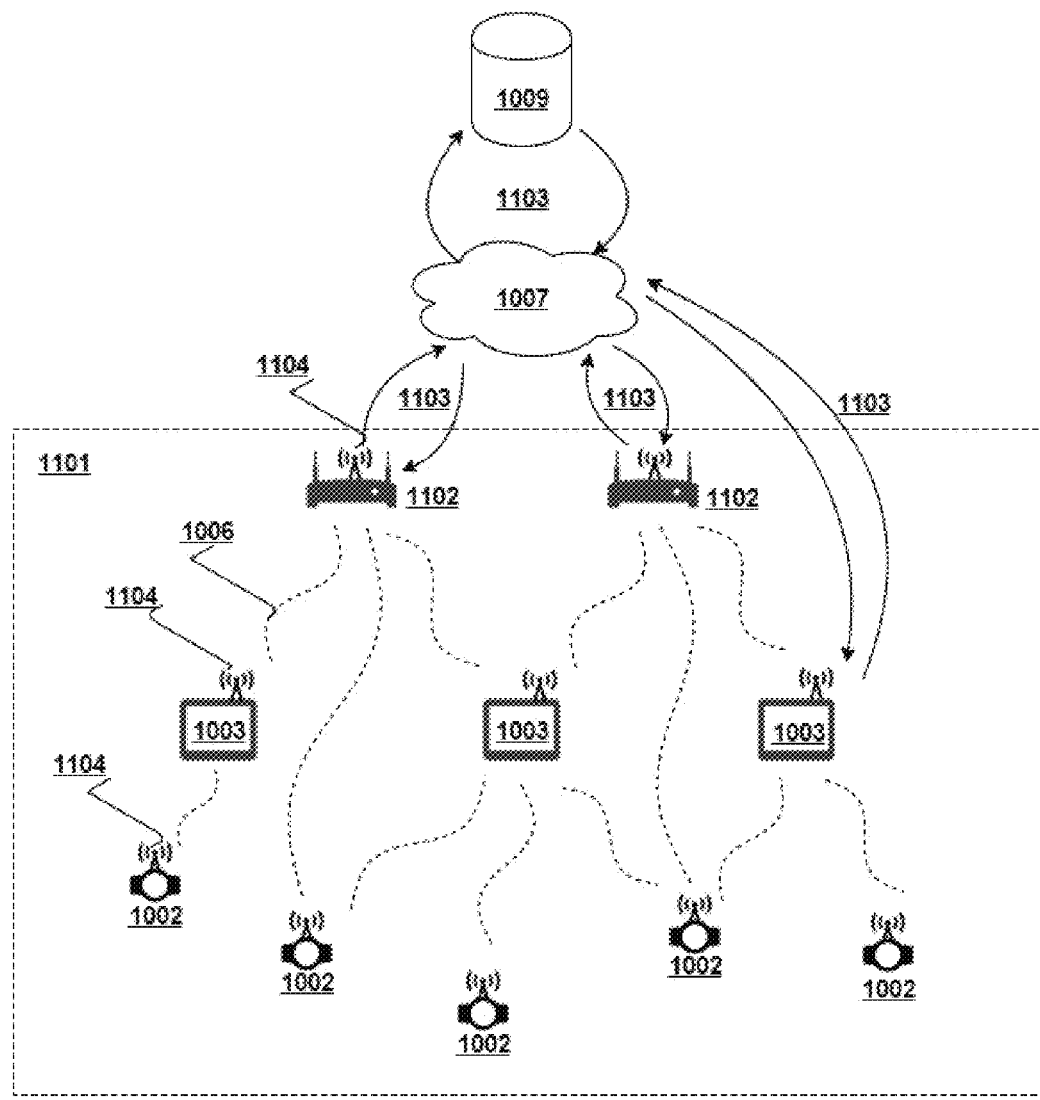
FIG. 2 is a diagram showing system communication regarding to selected embodiments of the current disclosure.

FIG. 2 is a diagram showing system communication regarding to selected embodiments of the current disclosure. The system implements two communication networks, a Primary Network and a Secondary Network. The primary network (e.g., the internet) acts as the main communication channel between a web server and database, a plurality of terminal devices, and a plurality of 'gateways' that can communicate via both the Primary Network and the Secondary Network. The Secondary Network establishes consistent communication with a plurality of wearable devices used to conduct transactions within the Point Of Sale System. More specifically, the Secondary Network establishes a two-way communication channel using low-power, long-range radio frequency (i.e., an 'Internet of Things' network).

With continued reference to FIG. 2, communication between the various endpoints in the system and the server (1008) is facilitated through a Secondary Wireless Network (SWN) (1101) that establishes a secondary communication channel via radio frequency waves (1006). This SWN can represent an 'Internet of Things' (IoT) network, whereby the SWN establishes consistent two-way communication with the wearable devices (1002) in the system using a low-power, long-range radio frequency communication protocol. In one embodiment, the SWN may take the form of a 'star' network, wherein communication between the server and individual nodes or endpoints in the system is facilitated through 'gateway' nodes (1102) that communicate both with the primary network (1009) and SWN (1101). In an alternative embodiment, the SWN (1101) may be configured as a 'mesh' network, wherein communication between two given nodes in the SWN (1101) is possible, and individual nodes may directly communicate via the SWN (1101).

Wearable Device (1002): a wearable device used by the customer while within the facility. It contains a printed circuit board, a series of visual indicators, and a transmitter for sending and/or receiving wireless communication packets ("payloads") to and from the server and other nodes ("terminal devices"). A wearable device represents a type of endpoint or node within the system. The nature of the electronic wearable devices (or simply 'wearable device(s)') is further discussed herein.

Terminal Device (1003): a physical machine contained within the grounds of the facility that enables customers to purchase and/or redeem pass or prize tickets. A terminal may be configured to support the purchase/redemption of multiple products (i.e., a customer can purchase concessions such as food and drinks, as well as purchase a go-kart ticket at that device), or be configured such that only one product may be purchased or redeemed at that location. A terminal represents a type of endpoint or node within the system. Terminal devices are explained in further detail herein. A register (1004) is a type of terminal device.

RFID Reader (1005): a powered internal or external device that interacts with a terminal device. It is used to interrogate a wearable device to obtain the unique RFID tag number associated with that wearable device using radio frequency waves (1006). This, in turn, enables the system to uniquely identify a customer and ascertain the status of their account.

Network (1007). A communication network that provides a means of passing messages between endpoints (terminal devices and wearable devices) and the web-based transaction server. This may represent the interne, an intranet, or other established means of communication, which in certain embodiments is a wireless network for wireless communications. For the purpose of this disclosure, this network (1007) will henceforth be referred to as the Primary Wireless Network (PWN).

Transaction Server (1008): a physical web server that acts as the main communication layer between SWN gateways, terminal devices, and the database (1009). The server is responsible for receiving and parsing incoming messages (payloads) sent from nodes within the system, sending response payloads as appropriate, as well performing the majority of conditional logic and workflows required to conduct transactions and provide the remaining functionality offered by the system.

Database (1009): the database consistently stores records concerning information about customers, the status of their respective accounts, whether or not a customer is currently associated with a wearable device, and which unique wearable device identifier is associated with that person.

Passive RFID Tag (1011): a passive Radio Frequency Identification (RFID) transponder. A passive transponder requires no external power source and contains an integrated antenna attenuated to an appropriate radio wave (1006) frequency, and an integrated non-volatile memory wherein a globally unique identification (GUID) number is stored. The GUID can be ascertained by exciting or interrogating the RFID tag (1011) by placing it in close proximity to an externally powered RFID Transponder (1005) attenuated to the same radio wave (1006) frequency. For the purposes of the present disclosure, the passive RFID transponders will henceforth be referred to as "RFID Tags," and the corresponding GUID as the "RFID Tag Number." Similarly, the externally powered Radio Frequency Transponder(s) (1005) will be henceforth referenced as "RFID Readers" for clarity.

Secondary Wireless Network (1101): communication between the various endpoints in the system (1002), (1003) and the server (1008) is facilitated through a secondary wireless network (SWN) (1101). The SWN (1101) allows the passing back and forth of communication messages between nodes that may not be directly connected to the PWN (1007) by providing a secondary communication channel that operates in the radio frequency range (1006). In a general sense, the SWN is in essence an Internet of Things (IoT) network, which comprises a low power, long-range communication network that passes information through the radio frequency spectrum. The SWN should have a communication range such that all endpoints (1002, 1003) within the bounds of the facility can be accessed at any given time. The SWN (1101) may be comprised of the following: (1) Wireless 'gateways' (1102) that are directly connected to the PWN (1007) and act primarily as a means of relaying messages between various endpoints (1002), (1003) and the server (1008) through the PWN (1007). In one embodiment, communication with the PWN (1007) by the gateway(s) (1102) takes the form of HTTP requests (1103). Alternatively, some terminal devices (1003) (which also represents a node in the SWN) may communicate directly with the PWN (1007) via PWN requests (1103). As is further discussed herein, one embodiment of a terminal device (1003) may constitute an iPad, tablet, or other form of personal computer. These devices typically have a wireless adapter inherently built into the device, which would allow it to communicate with the PWN (i.e., the internet). In other embodiments, a terminal device may be embedded inside an arcade game and be comprised of a custom circuit board and components which may not include a PWN adapter (2106, FIG. 4). In such embodiments, communication with the server (1008) is provided via the SWN gateways (1102) only. As will be appreciated by those skilled in the art, requests made over HTTP (hypertext transfer protocol) may also be made over HTTPS (HTTP secure) for more secure network communications between two devices.

Secondary Wireless Network Gateway (1102): A physical device capable of sending and receiving messages via the PWN and SWN. In one embodiment, this can be a LoRaWAN gateway device that is further comprised a second wireless adapter that allows the device to communicate with the PWN. This may be realized by a MultiTech MultiConnect Conduit by MultiTech, Inc., or the LL-BST-8 LoRa Gateway by Link Labs, Inc.

Primary Network Request (1103): packetized series of data containing information or commands, transmitted via the PWN (1007). In one embodiment, these requests may be realized by an HTTP request. In other embodiments, this may represent a socket network request (SNR).

Figure 3:
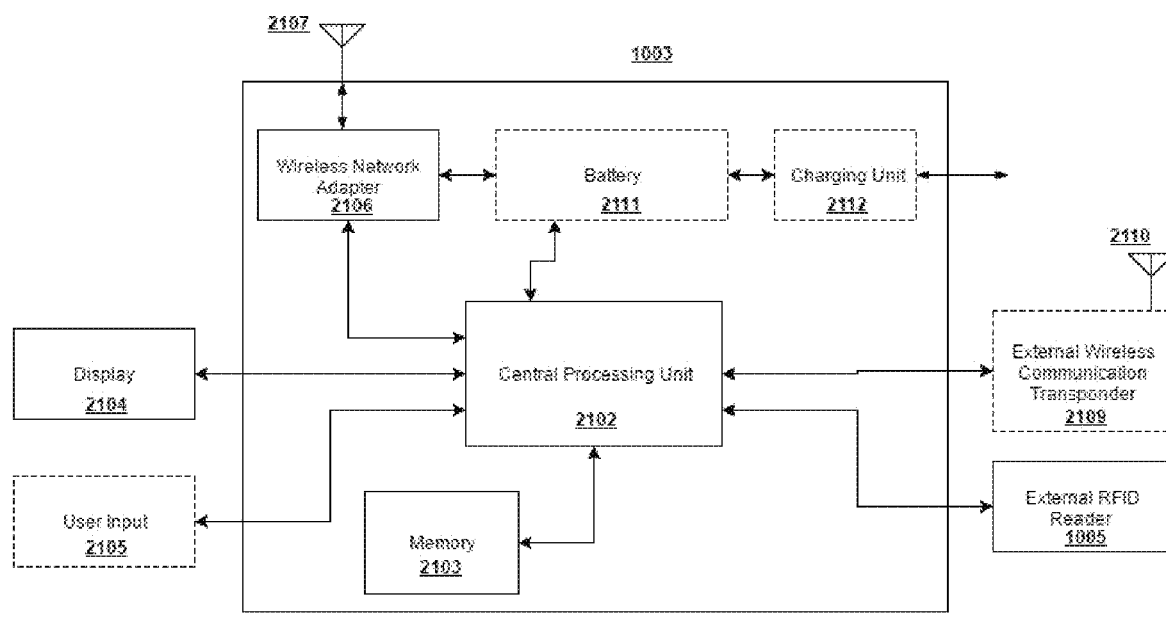
FIG. 3 is a diagram representing the components of a terminal device according to selected embodiments of the current disclosure.

FIG. 3 is a representation of the components that can comprise a terminal device. Each terminal device may integrate with an RFID Reader used to ascertain the value of the passive RFID tag that can be embedded within a wearable device. The RFID Reader (1005) acts as a proximity trigger to initiate a transaction Terminal Devices (1003): in another aspect of the present disclosure, the system may contain a plurality of terminal devices that acts as the primary means of conducting transactions (i.e., purchasing and/or redeeming pass tickets) within the facility. Said terminal devices (1003) may be realized in a variety forms or embodiments. Across all embodiments, the terminal devices (1003) may comprise the following functional components: Terminal Device Central Processing Unit (2102) used to execute commands and logic; Terminal Device Memory (2103), which is a non-volatile memory device used to store information; Terminal Device Display (2104), which is internal or external display used to convey visual information to the customer; Terminal Device User Input (2105); which is a device that enables the customer to select from various products (2002) or issue various commands; Terminal Device PWN Adapter (2106), which is an internal or external wireless network adapter that can allow the terminal device to communicate to the server (1008) via the PWN (1007); and Terminal Device PWN Antenna (2107). The Terminal Device PWN Adapter (2106) described above may further be comprised of an internal or external antenna (2107) attenuated to an appropriate frequency such that communication via the PWN (1007) is possible. Terminal Device SWN Transponder (for example, LORA) (2109) is a second internal or external wireless communication adapter such that the terminal device (1002) may communicate via the SWN (1101). Terminal Device may also have an SWN Antenna (LORA) (2110). The Terminal Device SWN Adapter (2109) described above may further be comprised of an internal or external antenna attenuated to an appropriate frequency such that communication via the SWN (1101) is possible. Terminal Device Battery (2111) is a battery or other energy storage device capable of storing or discharging electrical potential. Terminal Device Charging Unit (2112) is a charging unit (i.e., an externally accessible port that can be connected to an external power source via a cable or physical link), used to restore electrical charge to the battery (2111).

Figure 4:
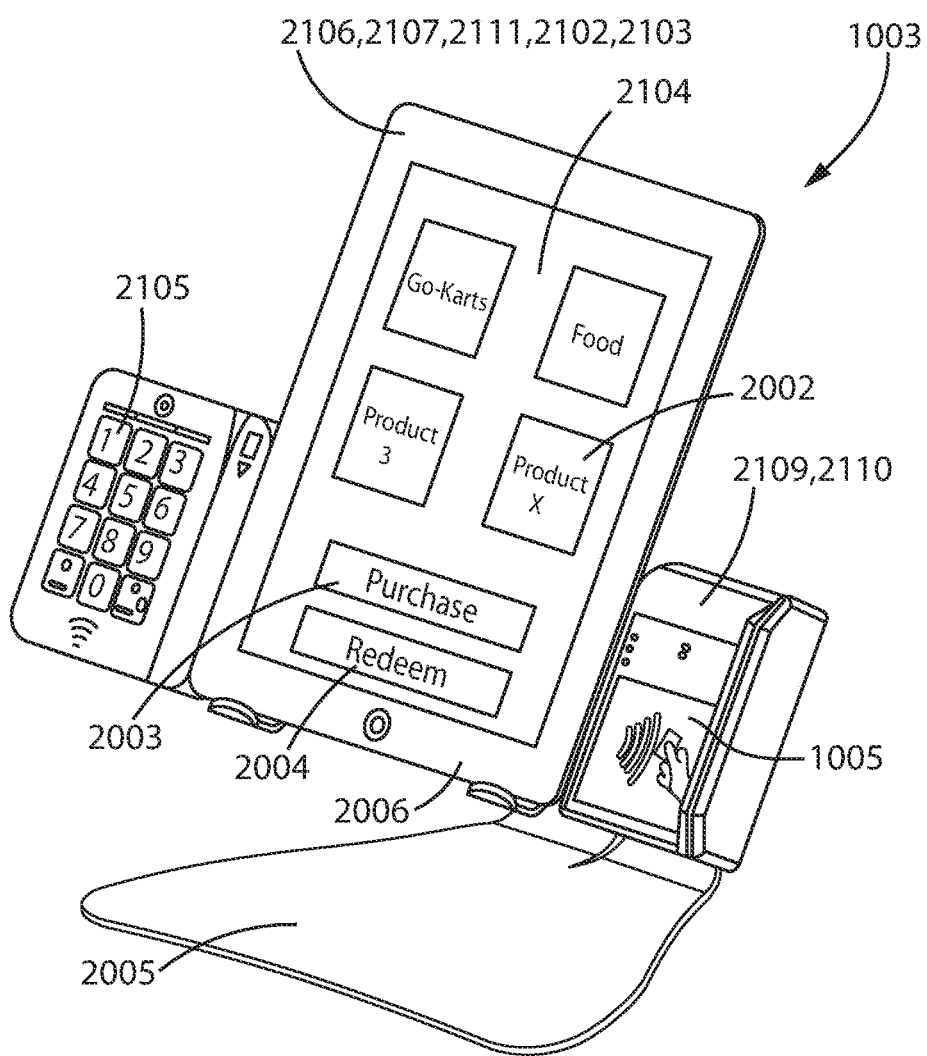
FIG. 4 shows a terminal device according to selected embodiments of the current disclosure.

FIG. 4 shows a terminal device according to selected embodiments of the current disclosure. The terminal device may comprise an iPad, tablet, or similar device that further integrates with an external RFID reader.

A terminal device (1003) can be realized by a tablet, personal computer, or the like (2006), (henceforth referred to as a 'table). In such an embodiment, the CPU (2102), memory (2103), display (2104), PWN adapter (2106) and antenna (2107), and charging unit (2112) can be inherently contained within the housing of the device. In such an embodiment, the terminal device can be further comprised of an external RFID reader (1005) that interfaces with the tablet (2006) through a physical or wireless link such that the output of the RFID reader (1005) can be ascertained by the device (1003). In one such embodiment, the user input (2105) can be provided via an appropriate user interface display on the tablet screen/display (2104). In an alternative embodiment, the user input (2105) can be realized by an external input device (i.e., a keyboard, keypad, or similar device), that interfaces with the tablet (2006) via a physical (i.e., a cable) or wireless communication link. In the above embodiments, the terminal device can be configured such that the user may select from multiple available products (2002) to purchase (2003) or redeem (2004) as appropriate. In an alternative embodiment, the terminal device can be configured in such a way that only a single product (2002) is purchasable or redeemable from that terminal device (1003) (such terminal device embodiments comprising a tablet are henceforth referred to as 'kiosk terminal devices' for convenience). As discussed previously, the tablets used to realize the kiosk terminal devices typically have a PWN adapter inherently embedded, and as such can communicate directly via the PWN (i.e., the internet).

Again referring to FIG. 4, a kiosk terminal device can be configured via the system software to perform a number of functions offered by the system. Namely, a given kiosk terminal device can selectively allow a subset of the total available products within the park to be purchased or redeemed at given location. In one embodiment, this is achieved by displaying a unique webpage that displays only the desired subset of products on the screen/display (2104), as well as any possible actions that the customer can perform. In another embodiment, the available products at that location or device, and accompanying user interface, may be stored in persistent memory (2103). In still other embodiments, the tablet kiosks may otherwise be configured to perform other functions beyond purchasing and redeeming pass tickets. For example by displaying a different webpage on the tablet display (2104), the kiosk can be configured to allow a customer to enter their information while registering, redeem prize tickets, modify the Credit On Account or Allowance for an Account or Account Person or purchase other items such as concessions.

To illustrate further, several possible use cases are explained. Multiple kiosk terminal devices may be placed near the entrance of the facility, with the display (2104) showing a webpage to enter his or her information (name, age, etc.) or pre-purchase pass tickets prior to using the facility. A number of kiosk terminal devices may further be placed at entrances to individual attractions. In this example, a kiosk terminal may be placed near the entrance to the ropes course, and a customer may only purchase or redeem a pass ticket for the ropes course at that location.

Figure 5:
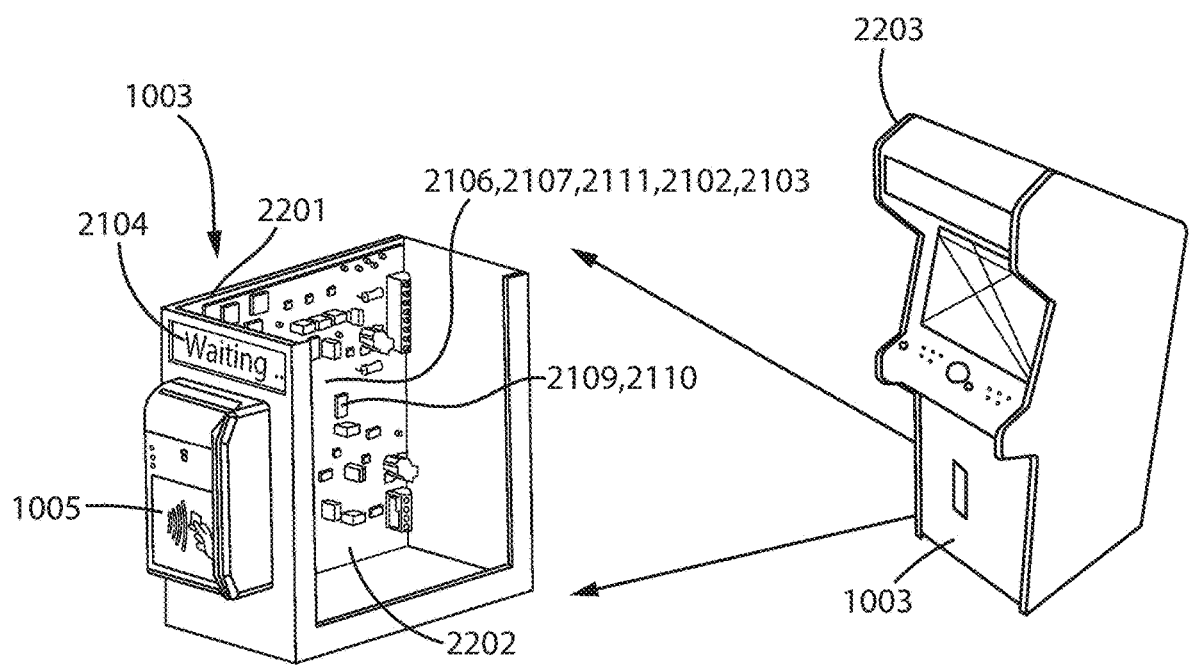
FIG. 5 shows a terminal device according to other selected embodiments of the current disclosure.

FIG. 5 shows a terminal device according to other selected embodiments of the current disclosure. The terminal device is further embedded within an external or existing enclosure or device, such as an arcade game.

A terminal device (1003) may take the form of the aforementioned components contained within an enclosure (2201), with said enclosure (2201) further comprising a top surface, a bottom surface, and at least one wall extending between the top and bottom surface. The enclosure (2201) can further comprise a cavity to house the necessary components (see FIG. 3) required for operation. Additionally, the enclosure can also include a series of holes or openings in the walls such that the terminal device display (2104) and RFID Reader (1005) are accessible, visible, and/or usable from outside the enclosure (2201). In such an embodiment, the embedded components described in FIG. 3 are placed on a printed circuit board or substrate (2202). In one such embodiment, the enclosure can be placed within an arcade game or other external device (2203), and be configured such that the given device can only redeem pass tickets for the arcade game or device (2203) in which it is enclosed. Further, the terminal device (1003) may additionally be comprised of a standard physical interface such that the terminal device (1003) can communicate with the embedded components native to the arcade game or device (2203) in which it is enclosed. In one embodiment, this interface can be comprised of the standard 5-wire interface commonly found in such arcade games. In other embodiments, an alternate means of establishing this link can be implemented.

The preceding configuration of a terminal device (1003) enables the terminal device (1003) to integrate the existing redemption system inherent in the arcade game (2203) into the other gamification methods provided in the present disclosure. This provides a novel and useful improvement over existing systems by unifying the gamification or redemption methods across the various devices in the facility into a single system.

Figure 6:
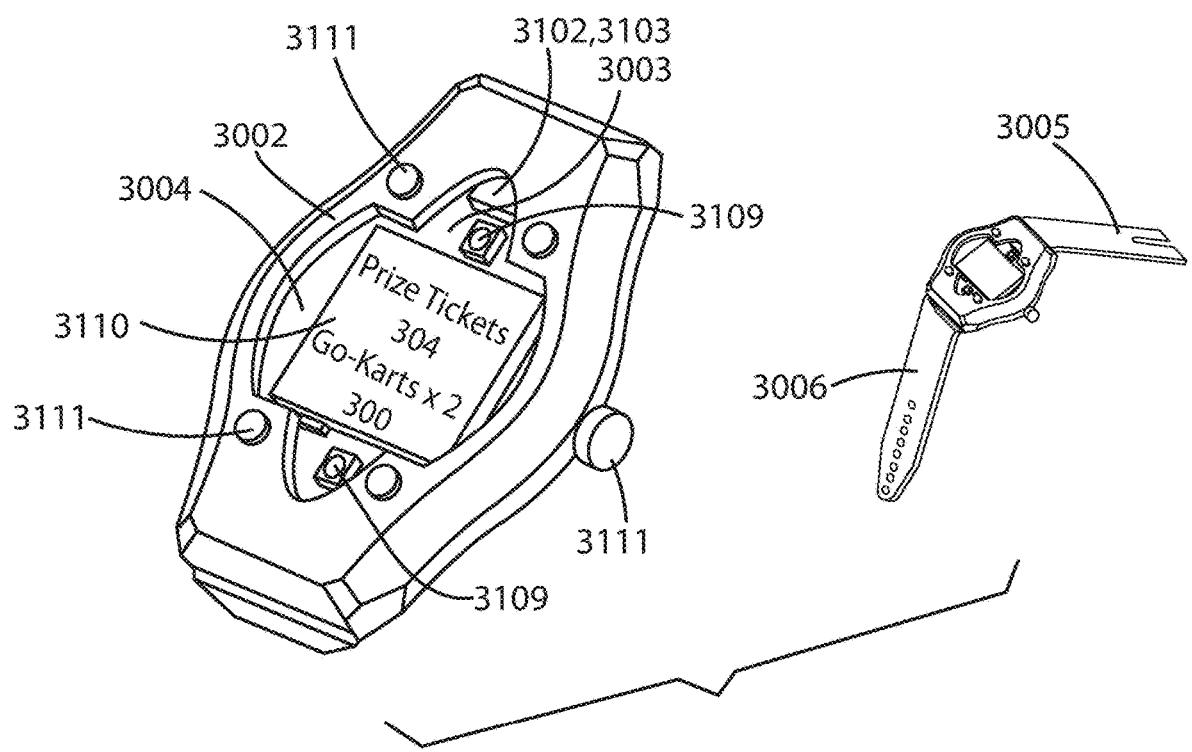
FIG. 6 is a perspective view of a wearable device according to selected embodiments of the current disclosure.

FIG. 6 is a perspective view of a wearable device according to selected embodiments of the current disclosure. The wearable device contains a plurality of visual indicators embedded within a housing, with the housing being configured in such a way as to allow customers and Facility Staff members to see the status of the indicators from a distance. The wearable device may further be integrated with a series of straps or other attachment mechanisms such that the device can be temporarily but securely affixed to an individual.

An electronic wearable device contains a plurality of embedded components placed on a printed circuit board or substrate (3004). The embedded components are further contained within an external enclosure or housing (3002). The housing may further comprise a cavity to accommodate the substrate (3004) and associated components, such as a battery (shown in FIG. 7, 3104). In one embodiment, one or more of the external faces of the housing (3002) may be further comprised of a transparent or translucent covering, film, or other material (3003), such that the visual indicia or indicators (shown in FIG. 7, 3108) are visible from a distance. The enclosure may further be comprised of a series of input devices (i.e., buttons, dials, or the like) (3111), placed on one or several of the external faces of the enclosure (3002) to allow a user to interact with the wearable device (1002). In another embodiment, one or more straps, bands, or the like (3005), (3006) may be affixed to the enclosure (3002) such that the wearable device can be secured around the wrist of a person. In another embodiment, the enclosure (3002) may be otherwise integrated with or affixed to a hook, snap, or other attachment mechanism or device that would allow the enclosure to worn on various other parts of the body, including but not limited to the leg, head, or neck. In such embodiments, the enclosure (3002) and accompanying attachment mechanism may take the form of a necklace, anklet, badge attached to an article of clothing, or similar realizations. In still another embodiment, the wearable device may be further woven into or otherwise integrated into an article of clothing such as a hat, sock, glove, or the like.

Figure 7:
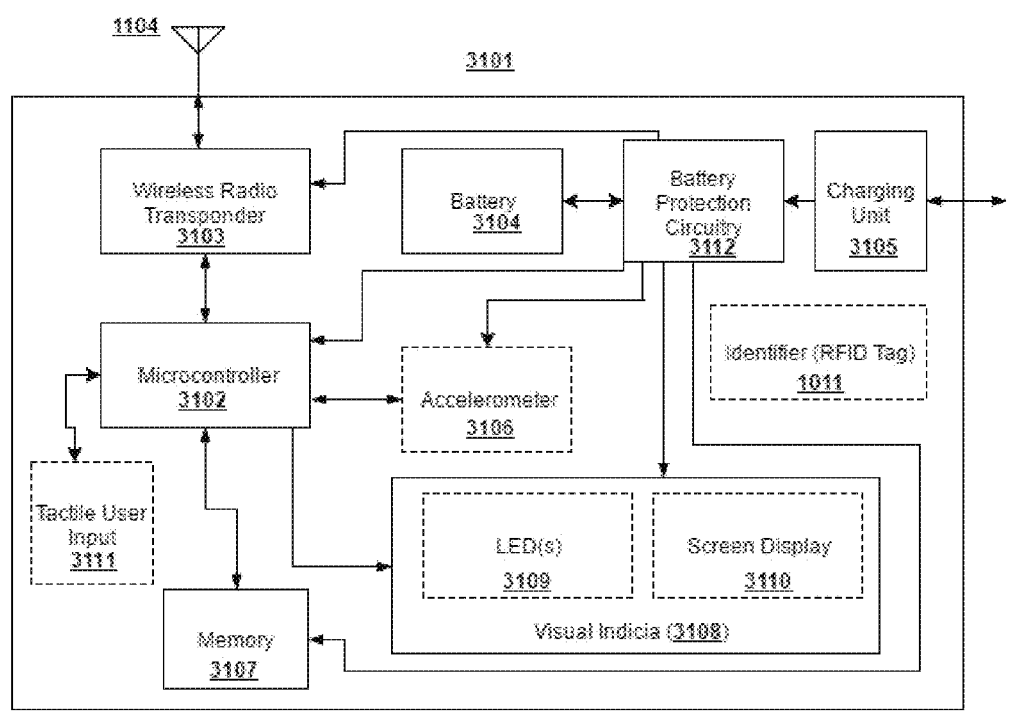
FIG. 7 is a block diagram showing the components a wearable device according to selected embodiments of the current disclosure.

FIG. 7 is a block diagram showing the components a wearable device according to selected embodiments of the current disclosure. A wearable device is comprised of a visual indicator or indicators, which in turn may include LEDs/photodiodes and/or a small LCD screen. Additionally, the wearable device is further comprised of a wireless radio transponder (or wireless network adapter) that establishes a consistent two-way communication channel with the Secondary Wireless Network.

Wearable Device Components (3101) may include the following components: Microcontroller (3102) is a microcontroller (MCU) integrated circuit (IC) as is commonly found in devices that contain embedded electronics. Several examples of an appropriate selection may include the ATMEGA328-AUR by Atmel, Inc. or EFM32TG110F32-QFN24 by Silicon Labs. Wireless Radio Transponder (3103) is an IC that interfaces with the microcontroller (3102) such that the wearable device is able to communicate to the gateways (1102) via the SWN (1101) via radio frequency waves (1006). In one embodiment, the wireless radio transponder (3103) may interface with a distinct host MCU through a standardized digital interface protocol such as SPI, I2C or UART. In this embodiment, two such examples are the SX1257 or SX1301 from Semtech. In another embodiment, the wireless radio transponder (3103) may contain an embedded MCU (3102) within a single chip package, such as the RN2483 or RN2903 from Microchip Technology, Inc. Battery (3104) is a rechargeable energy source (i.e., a rechargeable battery) capable of repeatedly storing and discharging electric potential. In one embodiment, this may constitute a prismatic Lithium-Polymer cell such as the Tenergy 360817 from all-battery.com. In another embodiment, the rechargeable energy source may constitute a coin-cell (also commonly referred to as a "button") type battery cell, such as the VL-2320/HFN or ML-2020/H1CN, produced by Panasonic. Charging Unit (3105) is the component by which the wearable device battery (3104) is recharged. In one embodiment, this may be realized by a port or plurality of connection points that form a direct contact with a plurality of corresponding external connection points. The direct contact between said points acts as the means by which electric potential is transferred from the external source to the battery (3104). In one such embodiment, this may be realized, for example, by a micro-USB port wherein an external cable or physical link can be inserted to provide an electric potential from an external source. In another such embodiment, the direct contact mechanism(s) may be realized by mating spring-loaded connectors such as the TBR-6632F-3-30-0000 and the TBP-4725F-3-30-0000 "pogo-pin" connectors available from Yokowo Co. Ltd, or similar such devices. In yet another embodiment, charging of the battery (3104) may be achieved through indirect contact, e.g. wirelessly. In such an embodiment, the charging unit may be comprised of an inductive coil embedded in the body of the wearable device (1002), and the transfer of electric charge is achieved by placing the wearable device (1002) in the vicinity of a corresponding inductive coil attached to an external power source. In such an embodiment, the charging unit (3104) may be realized by 760308101208 by Wurth Electronics, Inc. or similar device. Also in this embodiment, the charging unit may further include appropriate ICs to be used in conjunction with the inductive coils to produce a restorative electrical charge to the battery (3104). One such example is the NXQ1TXH5/101J IC produced by NXP semiconductors. Across all embodiments, the charging unit (3105) may be further comprised of or used in conjunction with accompanying protection circuitry (3112) such that the battery (3104) is charged and discharged a manner congruent with safe operation. Accelerometer (3106) is a 3-Axis analog or digital accelerometer or motion-sensing device. In one embodiment, the accelerometer is packaged as a self-contained IC with digital communication channels for interacting with the wearable device microcontroller unit (3102). In some embodiments, these communication channels may implement the SPI or I2C communication protocols. In some other embodiments, the accelerometer or motion-sensing unit may output only analog signals that must be then converted to digital signals through an Analog-To-Digital Converter (ADC) in order to interact with the microcontroller unit contained in the wearable device (3102). Some examples of the embodiments of the motion-sensing device may include the BMA250E 3-Axis accelerometer by Bosch Sensortec, or the ADXL344ACCZ-RL7 by Analog Devices. In certain embodiments, the motion-sensing unit should adhere to at least the following common characteristics: (1) is capable of measuring linear acceleration or change in rate of motion across three ordinate axes, (2) is capable of measuring accelerations up to 10 g (previous studies by Pendrill and Eager have shown that accelerations experienced during trampoline jumping can exceed 9 g Link: http://www.fysik.org/fileadmin/nrcrlekplats/Pendrill_Eager_rev.pdf), and (3) can be operated with a DC supply voltage not exceeding 5V. Memory (3107) may include a nonvolatile semiconductor memory storage device, such as a flash memory. In embodiments where the wearable device implements such a memory device, examples may include SST25VF010A by Microchip, Inc., the AT25XV041B-MHV-T by Adesto Technologies, or devices of a similar nature. In certain embodiments, the non-volatile memory device (3107) should meet at least the following minimum requirements: (1) Be able to persistently store computing instructions, data, or the like in a nonvolatile manner such that the data is retained in the absence of a power source, and (2) provide a means of communication between the memory device (3107) and the MCU (3102). Visual Indicators (or indicia) (3108) are one or more components embedded within the body of the wearable device (1002), used to convey visual information to the wearer. In one embodiment the indicators are visible from 6.5 to 25 feet away from the customer (i.e., a green light viewable by FEC Staff members). The visual indicia (3108) are configurable, controllable, and/or programmable by the wearable device MCU (3102) in such a manner that the state of the indicia can convey relevant information regarding their status within the facility, or alternatively, other information regarding the status of their account within the system. In one embodiment, these data may be conveyed by the color of the indicia. In another embodiment, these data may be conveyed through text, symbols, or the like. In still other embodiments, these data may be conveyed through a subset or combination of the above. Referring to FIG. 6, this information can, for example, include which attractions pass tickets have already been purchased for and are available for use, the quantity of tickets, and the scheduled start time (if applicable) (3007). This may be conveyed via a message in the form of text, symbols, or the like on the LCD screen (3110) (i.e. JMPx2 can indicate that two pass tickets to the jump deck are available to be redeemed, or that the user has 25 tokens to use at the arcade games). Alternatively, colors can be used to relay this information. As a further example, visual indicia (3108) may periodically cycle through a series of colors, with each color representing a type of purchased pass ticket (i.e. The LED(s) (3109) may light up orange to indicate that a pass ticket for the ropes course is available to that AccountPerson, or yellow to indicate that a mini-golf ticket is available). In one embodiment, this may occur on a timed interval (i.e. the wearable device begins flashing, changes colors, or displays a relevant message when the start time for a purchased pass ticket is about to come up). In another embodiment, this information is displayed after a prompt from the wearer via the user input (3111), which sends a request payload requesting the status of available pass tickets. Additionally, the wearable device may display other information including the amount of earned prize tickets associated to that AccountPerson (3008). In still another embodiment, the wearable device may also display other information pertaining to the status of the park or other messages not relevant to pass or prize tickets. As an example, the server (1008) may send a message to all wearable devices indicating that the facility is closing in ten minutes, or may a send a message to a single wearable device (1002) requesting the wearer to come to the front desk in case of an emergency. Control of the visual indicators via the two-way long-range communication provided by the SWN in this manner represents a significant improvement over existing systems that implement passive RFID cards, RFID bracelets, or the like, which cannot provide real-time status information that can be quickly and easily ascertained from a distance.

These visual indicia may further be comprised of any subset, combination, or extension of the following components. LED(s)/photodiode(s) (3109) are capable of displaying multiple colors (red, green, blue) in varying intensity in a controlled manner. In one embodiment, examples may include the following commercially available components: LTRBGFSF-ABCB-QKYO-Z from OSRAM Opto Semiconductors Inc., the ASMT-YTB7-0AA02 from Broadcom Limited, Inc., or the QBLP679E-RGB from QT Brightek. In certain embodiments, the LED/photodiode should meet at least the following commonalities: (1) Possess at least three distinct anodes to allow for individual color and intensity control, and (2) have a forward voltage drop not exceeding 5V. Screen Display (3110) is a small display screen embedded within the wearable device (1002) that can be programmed or otherwise commanded by the wearable device MCU (3102) to display various visual information to the wearer. The displayed information may include text and/or colors. In one embodiment, the Screen Display may be comprised of an LED or OLED screen such as CFAL12864N-A-B4 by Crystalfontz America Inc. or similar device. In other embodiments, the display can be realized using other available technologies such LCD displays or similar devices. In certain embodiments, the Screen Display (3110) can display one or multiple colors, and alter the status of the display in a controlled manner via the MCU (3102). Tactile User Input (3111) issues commands to the wearable device MCU (3102) to send and/or receive payloads through the SWN, or perform another internal function or series of functions stored in the wearable device control logic through a tactile input. In one embodiment, this may be comprised of one or a plurality of tactile switches (i.e., a button or buttons) located on the exterior of one or multiple of the wearable device (1002) faces. In such an embodiment, the tactile input (3111) may, for example, be realized by 7914J-1-024E by Bourns, Inc., or similar device. In an alternative embodiment, the tactile input (3111) may be realized via a mechanism similar to a wristwatch crown, whereby the user is afforded rotary and tactile motion through the mechanism. Such mechanisms are ubiquitous in wristwatches and the like so all manifestations of such an implementation are not expounded upon herein. Battery Protection Circuitry (3112) is a plurality of passive and/or active circuit components arranged in such a way that the charge and discharge profiles of the battery (3104) are maintained at acceptable levels for safe operation during the course of use. Analog Accelerometer (3200), in an embodiment of the wearable device (1002), discussed in more detail below, is an accelerometer or motion-sensing device (3106) with an analog interface, and additional components may be incorporated to facilitate interpretation of the resulting signals by the wearable device MCU (3102).

Figure 8:
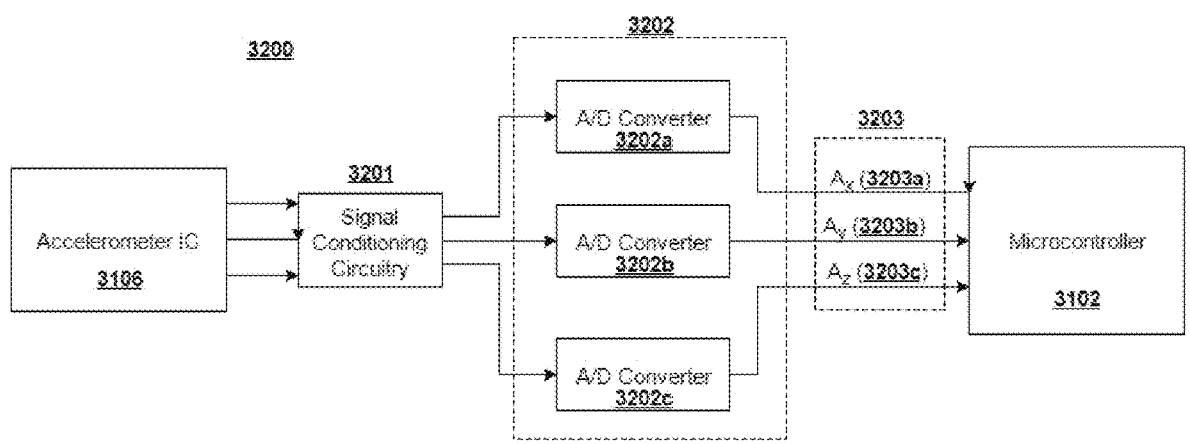
FIG. 8 is a block diagram illustrating obtaining accelerometer signals using an Analog-to-Digital converter according to selected embodiments of the current disclosure.

Referring to FIG. 8, these additional components may comprise the following. Signal Conditioning Circuitry (3201) is a plurality of passive and/or active circuit components including but not limited to capacitors, resistors, and operational amplifiers configured in such a way as to improve and/or enhance the analog voltage signals emitted by the accelerometer (3106) prior to being digitized. In one embodiment, the aforementioned components may be configured to form a plurality of low-pass, high-pass, or band-pass filters. In another embodiment, the aforementioned components may be arranged in such a way to amplify or attenuate the individual analog signals emitted by the accelerometer (3106). In still another embodiment, the aforementioned components can be arranged in any combination of the aforementioned configurations. In an embodiment of the wearable device (1002) wherein the MCU (3102) does not contain an internal analog-to-digital converter (ADC) (3202) or said ADC is not implemented for any reason, a plurality of discrete ADC IC(s) may be implemented to digitize the analog voltage signals emitted by the accelerometer or motion-sensing device (3106). In such an embodiment, several suitable examples for implementation may include the AD7999YRJZ-1500RL7 by Analog Devices, Inc. or the ADS1015IRUGR by Texas Instruments, Inc. In certain embodiments, the selected component(s) should meet the following requirements: (1) Provides at least three (3) distinct channels capable of measuring analog signals independently of one another, (2) the selected components should be capable of digitizing a signal with an accuracy of at least 8 bits, and (3) be capable of operating on a DC supply voltage not exceeding 5V.

In some embodiments, the wearable device MCU (3102) may use the measured acceleration values obtained via the motion-sensing device (3106) and use said values to calculate various parameters and metrics, which will be subsequently explained in further detail.

With continued reference to FIG. 5, A/D Converter—Ax (3202*a*) is the ADC channel responsible for digitizing the analog signal denoting acceleration or motion in the x-axis in the Cartesian coordinate frame. A/D Converter—Ay (3202*b*) is the ADC channel responsible for digitizing the analog signal denoting acceleration or motion in the y-axis in the Cartesian coordinate frame. A/D Converter—Az (3202*c*) is the ADC channel responsible for digitizing the analog signal denoting acceleration or motion in the z-axis in the Cartesian coordinate frame. Filtered Acceleration Signals (3203) are the collective analog or digital signals obtained from the accelerometer (3106) for all three axes of linear acceleration. Ax (3203*a*) is the filtered and/or conditioned acceleration signal related to the x-axis in the Cartesian coordinate frame. Ay (3203*b*) is the filtered and/or conditioned acceleration signal related to the y-axis in the Cartesian coordinate frame. Az (3203*c*) is the filtered and/or conditioned acceleration signal related to the z-axis in the Cartesian coordinate frame.

In one aspect of the present invention, the system is configured in such a way that the system endpoints (terminal devices and wearable devices) communicate with the transaction server (1008) and database (1009) via packetized messages to perform a variety of functions. Namely, these functions may include the ability to purchase or redeem pass tickets, check available prize tickets, redeem prize tickets, receive status updates regarding impending redeemable pass tickets, receive emergency messages, request other information pertinent to a customer's account, or send or receive general messages of other kinds.

While existing credit management systems such as Sacoa™ and Embed™ provide a subset of the above features, such as the ability to store and redeem prize tickets, the cards (or more generally, RFID device) act only as a passive identifier and cannot communicate with the system in real-time. With this approach, the user can only ascertain the number of prize tickets they have, for example, by swiping the card at a kiosk. In contrast, the present disclosure presents a tangible and novel improvement over such existing systems by establishing a two-way communication protocol that allows a user and/or FEC staff to ascertain various aspects of their account in real-time from anywhere within the facility.

The means of providing these features, and accompanying nomenclature, are further explicated below. The wearable device(s) and/or terminal devices (1003) can provide a tactile user interface (3111) or user input (2105) whereby the customer can perform various functions. In one embodiment, once a customer has performed such a request via the input device (3111) or user input (2105), the endpoint can send a "request payload" via the SWN in the form of several key-value pairs. In other embodiments, a terminal device (1003) or wearable device (1002) can send such a request payload automatically or due to some external trigger or event, such as sending a purchase request once a customer scans his or her wearable device at a terminal device housed within an arcade game to activate it, or when sending activity metric information when certain criteria are met. In some embodiments, these request payloads are transmitted via the SWN (1101) and relayed to the server (1008) via the SWN gateways (1102) via a PWN request (1103). Upon receiving the request, the server can request information from the database (1009) or perform various other calculations, actions, or processes as dictated by the nature of the received request. Upon completion of these actions or processes, the server (1008) can send a "response payload" to the endpoint (wearable device or terminal device) that issued the original request, similarly structured in a plurality of key-value pairs. In some embodiments, this response may be relayed to appropriate endpoint via the SWN gateways (1101). In other embodiments, the response payload from the server can be transmitted to the appropriate endpoint via a secondary PWN request (1103). Several exemplary examples are provided below to further illustrate this process.

Various transactions can be conducted via the wearable devices (1002) and terminal devices (1003) within the facility. Relating to the discussion of pass tickets above, each available attraction or product available for purchase may be associated with a unique ProductID and various associated parameters, which may include the following: (1) a product name, (2) the units of measure and associated cost per unit of measure in monetary value, (3) if the product (2002) has a defined start time (i.e., is a scheduled pass ticket) or not, (4) whether or not the product represents a subscription product (a subscription product represents a product that is purchased on a recurring basis over a given period of time, i.e., a monthly gym membership), and (5) various parameters used to update or set the state of the visual indicia (3108) on a wearable device as appropriate.

In accordance with the above provision, the following are presented as additional aspects of the present disclosure: (1) an individual customer database record (also henceforth referred to as an "AccountPerson") can be associated to a database "Account" record, (2) multiple account records ("AccountPersons") can be associated with a single "Account" record, (3) an AccountPerson can have a defined "Allowance"—that is, an AccountPerson record can have a configurable maximum spending limit in terms of monetary value or equivalent pass tickets associated to that record. In this way, a parent or guardian can associate multiple children to his or her account, and subsequently set a maximum allowable spending amount available to each child. Furthermore, an AccountPerson can contain several other parameters associated with it. Namely, these may include (1) available "Credit On Account" (COA), or a defined monetary value available to the correlated customer. Note that this is different than an "Allowance" described above, which can be lower than the present COA, (2) Total purchased pass tickets not yet redeemed (subsequently referred to as "Inventory on Hand" (IOH)). As an example, a customer can pre-purchase two tickets to play laser tag at a later time but has not yet redeemed the tickets. As a second example, a parent can pre-purchase 20 tokens for each child to utilize the arcade games. In both of the above cases, that AccountPerson record would be associated with corresponding IOH records indicating that he or she has pre-purchased pass tickets that have not been redeemed or become valid.

Figure 9:
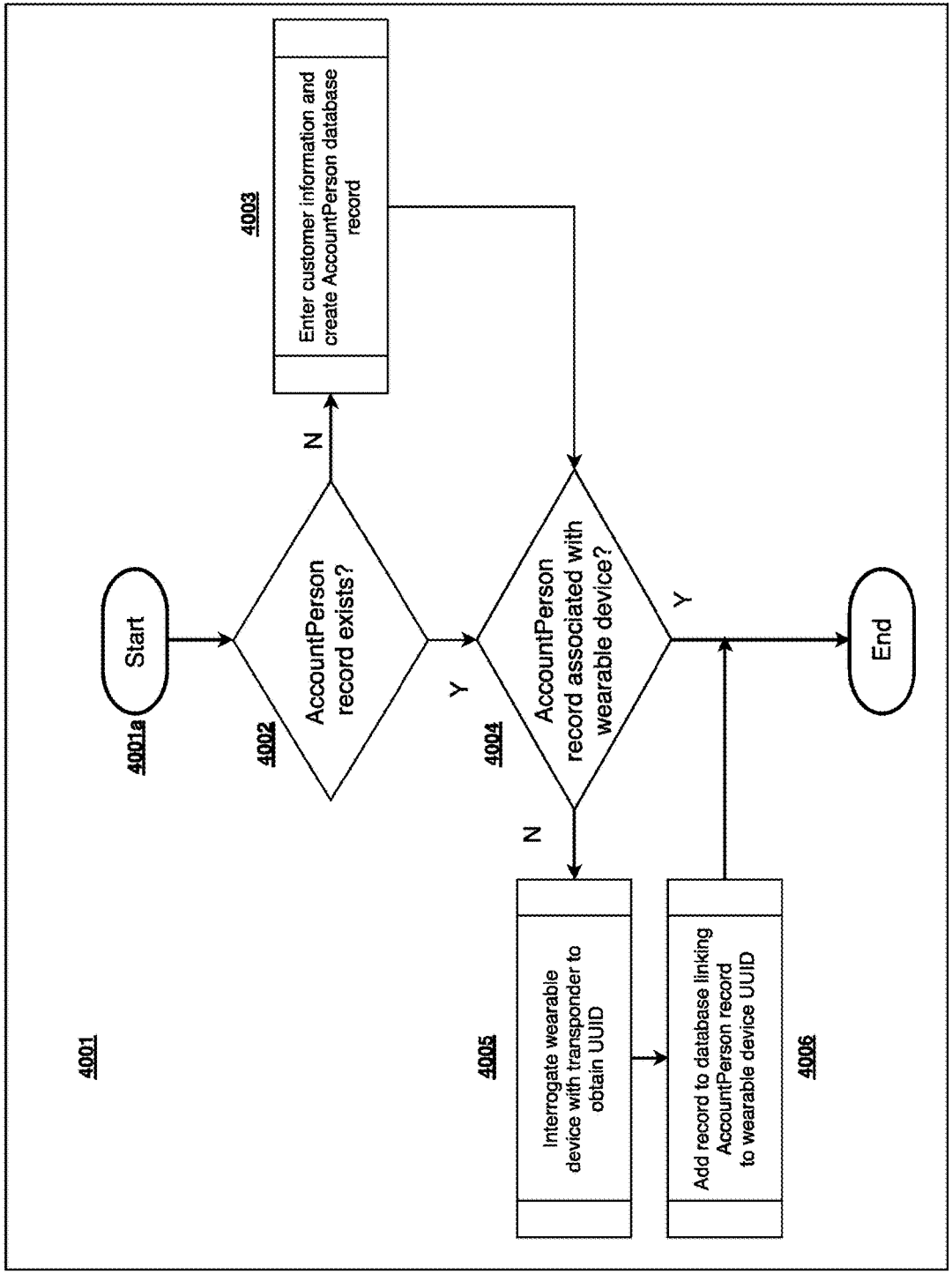
FIG. 9 illustrates a workflow by which a wearable device is assigned to a customer for use within the facility according to selected embodiments of the current disclosure.

FIG. 9 shows a wearable device assignment workflow (4001) and outlines the process by which a wearable device is assigned to a customer, such that the customer can perform transactions and receive status updates while inside in the facility. In one embodiment, a customer can temporarily "check out" a wearable device for use while inside the facility, then return the wearable device upon exiting. In another embodiment, the customer may choose to keep the wearable device to reuse the next time he or she comes back. In both embodiments, this process enables the system to uniquely identify a customer inside the facility and determine the status of their account through ascertaining the unique RFID tag number associated with a given wearable device. With continued reference to FIG. 9, the process of associating a wearable device with a customer can be realized as follows.

The process begins when a customer enters the facility (4001*a*). The process determines whether an AccountPerson record exists (4002). Use of the proposed system requires that an individual customer first be registered in the database (registered' implies that the individual has both an Account and AccountPerson record associated to them). If a customer is not yet registered in the database, he or she must first complete this step (4003). If a customer is already registered in the database, the workflow proceeds directly to 4004. If the customer does not yet have an Account record registered in the database, the customer enters pertinent information such as their name, contact information, etc. as required to create an Account record, and subsequently an AccountPerson record 4003 (i.e., an individual belonging to that account). This information can also include credit card information securely stored in the database, which is also linked to the Account record. The customer may optionally include children (i.e., additional AccountPersons) to his or her Account record, and set the allowance for each AccountPerson as desired. In one embodiment, the customer approaches a kiosk terminal device (1003) configured such that the display (2104) allows them to enter this information. This is accomplished via series of prompts displayed via the kiosk terminal device (1003). In another embodiment, a customer may perform this step at a register (i.e., a terminal device manned by a Staff member), where the Staff member can assist with entering this information. Upon entering all necessary and sufficient information regarding the Account, the kiosk terminal device (1003) or register (1004) issues a PWN request to add an Account and AccountPerson record to the database with the pertinent information. Following successful completion of this step, the process advances to 4004.

Next, the process determines whether there is AccountPerson record associated with a wearable device (4004). As previously mentioned, the customer may choose to temporarily "check-out" a wearable device (1002) while inside the facility. Alternatively, a customer can choose to keep a wearable device indefinitely and reuse the same wearable device (1002) during multiple visits. If the latter of these two cases is true, this will be indicated by the presence of a record in the database (1009) associating the AccountPerson record to the unique RFID number stored in the passive RFID tag (1011), which is in turn embedded in the wearable device (1002). If such a record exists, the process outlined in this FIG. 9 is complete and the customer is then able to patronize the facility using the wearable device to perform all remaining functions provided by the proposed system. If no such record exists, the process advances to 4005.

If there is no association with a wearable device, the process continues to interrogate a wearable device with the transponder to obtain UUID (4005). In one embodiment of the present invention, the process of assigning a wearable device to a customer is completed at a register (1004). Upon verifying in the system that a customer has a valid Account and AccountPerson record, a Staff member selects a currently unassigned wearable device (1002) (i.e., one that is not currently associated with an AccountPerson record in the database (1009)), and places the wearable device (1002) in the vicinity of an RFID transponder (1005) such that the radio frequency waves (1006) excite the passive RFID tag (1011). The RFID transponder then relays the value of the unique number stored in the Passive RFID tag (1011) (i.e., the RFID tag number) to the register (1004) and the process advances to 4006.

A record is added to the database linking AccountPerson record to wearable device UUID (4006). The terminal device sends a request payload to the server (1008) that contains the AccountPersonID and the value of the RFID tag (1011) obtained from 4005. Said request is relayed by the transaction server (1008) to the database (1009) via a PWN request (1103) containing the AccountPersonID and RFID tag number. The database (1009) then adds a record that links that AccountPersonID to the unique RFID tag number and associated wearable device. Once this record has been committed to the database, the process outlined in FIG. 9 is complete and the customer is then able to patronize the facility using the wearable device to perform all remaining functions provided by the proposed system.

Figure 13:
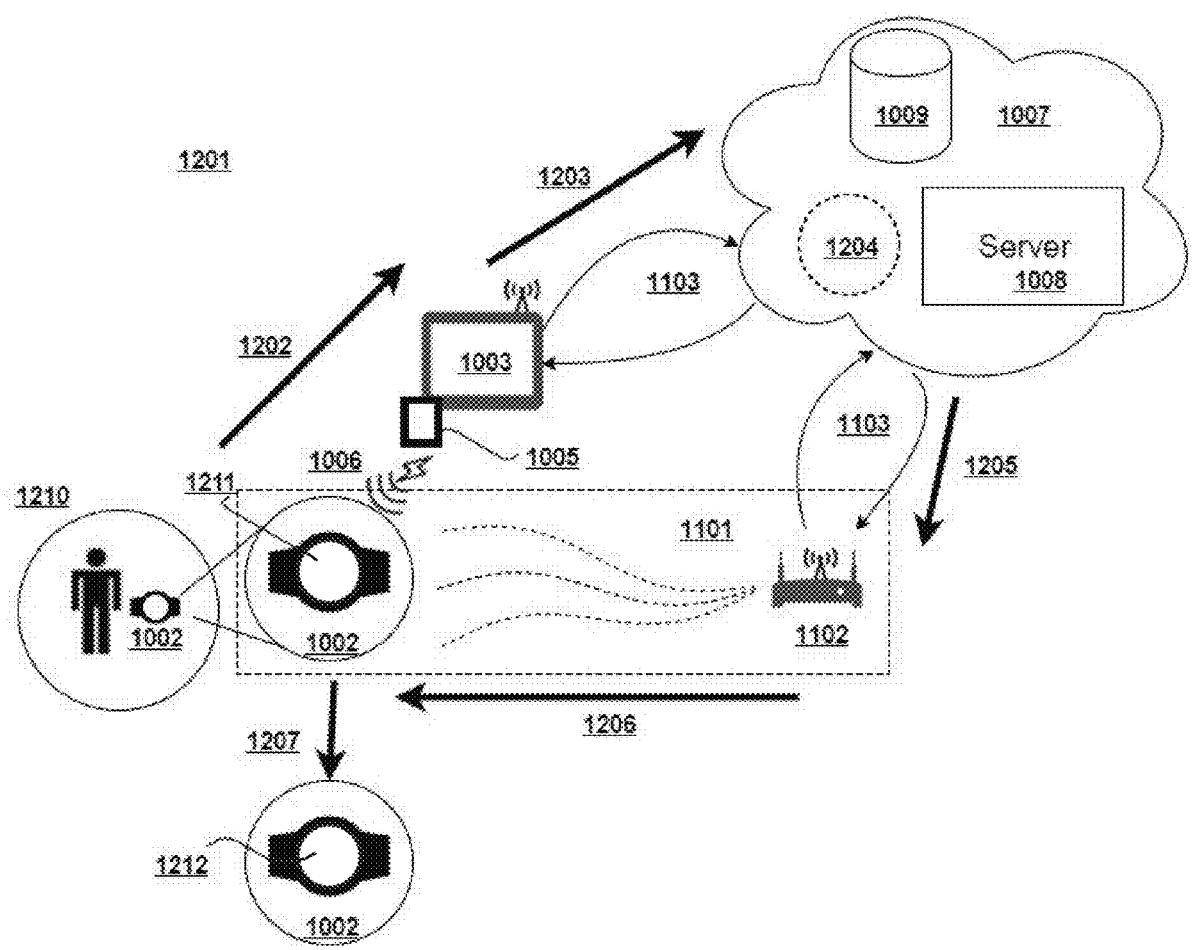
FIG. 13 illustrates a transaction workflow according to selected embodiments of the current disclosure.

FIG. 13 illustrates a transaction workflow (1201) according to selected embodiments of the current disclosure. The process implements two separate communication networks, namely (1) a Primary Network used to establish communication between terminal devices and the server (i.e., the internet), and (2) a low-power, long-range Secondary Network used to establish consistent communication between the server and the wearable devices. This Secondary Network can be equated to an Internet of Things (IoT) network that provides improved means of conducting and managing transactions within a Family Entertainment Center.

One embodiment of the overall transactional workflow can be further understood by referring to FIG. 13. After a wearable device has been assigned to a customer as described in FIG. 9, the customer afterwards goes about using the various attractions within the facility while wearing the wearable device (1210). If the customer is not currently expending a valid pass ticket, the visual indicators can indicate this fact by displaying a color (i.e., red) (1211).

When a customer wishes to purchase a pass ticket and initiation the transactional workflow (1202), he or she approaches a terminal device (1003). Depending upon the configuration of the terminal device (1003) approached, the customer may choose a product to purchase from a pre-defined selection, or may be limited to a single product option. Upon having selected the desired product(s) (if applicable), the customer places the wearable device (1002) in the vicinity of the RFID reader (1005) attached to the terminal device (1003). Because the passive RFID tag (1011) uniquely identifies the customer wearing it (through the checkout process described in FIG. 9), this action constitutes a proximity trigger that initiates the transactional workflow depicted in FIG. 13. When the RFID tag (1011) embedded within the wearable device (1002) is in sufficient proximity to the RFID Reader (1005), the radio waves (1006) emitted by the reader excite the RFID tag (1011) so that the unique value stored within the tag (the RFID tag number) can be determined.

Next, the system sends a Transactional Request Payload to Server (1203). After the value of the RFID tag (1011) has been ascertained by the RFID Reader (1005), the result is interpreted by the terminal device (1003). The terminal device then assembles a request payload including the value of the RFID tag ascertained in the previous step, and the ProductID(s) associated with the desired products to be purchased. This information is relayed to the server (1008) via a PWN request (i.e., an HTTP request or similar means).

Next, processing of the transactional request payload from the terminal device is done by the server (1204). Upon receiving a Transactional Request Payload via the PWN (1007), the server (1008) parses the transactional request payload and may perform a series of functions or processes to determine the validity of the request (i.e., whether the transaction is able to completed). To summarize, these processes can include ascertaining the AccountPerson record associated with the unique RFID tag number received in the transactional request payload, determining if the customer has sufficient COA and/or Allowance to complete the purchase, and whether the facility has sufficient inventory or capacity to complete the purchase. In one embodiment, these processes can be further understood by referring to FIG. 10 and FIG. 11. After determining the validity of the purchase request, the server constructs an appropriate response payload to relay to the wearable device.

After the server successfully constructs an appropriate response payload as described in (1204), the transactional response payload is then relayed (1202) to a SWN Gateway (1102) through PWN (1007) via a PWN request (1103).

Upon receiving a transactional response payload from the server (1008) as outlined in (1205), the SWN gateway (1102) may then relay the corresponding payload (1206) to the wearable device (1002) worn by the customer that initiated the transaction (1210). In one embodiment, this process may include further parsing of the initial response received in (1205) prior to relaying the message the wearable device (1002).

After the process described in (1206) has been completed, the Gateway (1102) emits the resulting payload through the low-power, long-range SWN (1101). In one embodiment, the resulting payload can include a unique identifier such that the payload is only received by a single wearable device (1002). In another embodiment, the resulting payload may be otherwise constructed such that a plurality of wearable devices can receive the same payload. As an example, if a parent or guardian purchases trampoline area tickets for himself and his three children, the resulting payload can be relayed to all four wearable devices simultaneously. The resulting payload can further be comprised of additional information regarding the products purchased, whether or not the transaction was a success, and parameters defining the desired state of the visual indicators of the wearable device(s) receiving said payload.

The transactional workflow depicted in FIG. 13 continues as the response payload described in (1206) is received by the wearable device (1002) through the SWN (1102), via the SWN adapter (3103) embedded within the wearable device (1002). Upon receiving said payload, the wearable device (1002) parses the parameters contained within it via the embedded MCU (3102). In one embodiment, the wearable device (1002) may then alter the state (1207) of the visual indicators (3108) embedded within the device to reflect the information contained in the response payload.

The above transactional workflow and underlying network structure provide significant novel improvements over similar workflows offered by a POS system implementing only passive RFID tags or cards, as are currently available. For example, if the transaction did not succeed due to insufficient available funds, the LCD screen (3110) embedded in the wearable device (1002) may display a short message such as 'Insufficient Funds, see Front Desk' while the LEDs flash red. Alternatively, if a customer originally tried to purchase an immediate pass ticket for an hour in the trampoline area and the purchase was a success, the LEDs may turn solid green, indicating that the customer is now able to access the trampoline deck. If instead the transactional request instead included a scheduled pass ticket, the wearable device (1002) may first display only a quick 'Purchase Success' message on the LCD screen (3110), and subsequently change the color of the LEDs (3109) to solid green once the start time of the purchased pass ticket has been reached. There are many other such permutations of the above examples that can be realized using the above methods and processes that are not explicitly listed above, such as displaying other colors besides green to indicate a customer has sufficient credits for a time-based activity. In another embodiment, for example, the visual indicators may display orange to indicate the customer is able to play on the ropes course, yellow if the customer has sufficient credits to use the batting cages, etc.

In another embodiment of the present invention, the transactional workflow process (1201) describe in FIG. 13 can be further implemented in whole or in part to provide additional functionality beyond purchasing pass tickets. For example, a facility Staff member may issue a facility-wide status update message to all customers from a register (1004). In this example, the process depicted in FIG. 13 can begin at 1203. The register (1004) issues a status update request payload via the PWN (1007) and appropriate PWN request (1103), which is in turn processed by the server (1008). The server constructs the corresponding response payload (1204) and subsequently relayed (1205) to one or several SWN gateways (1102) via the PWN. In turn the gateways (1102) relay the response payload to all currently assigned wearable devices (1002) via the SWN (1101). Following this process, all customers will receive a notification, for example, that the facility is closing soon, or that a child is missing, or other relevant information.

The exact nature of the payload structure and possible states of the visual indicators described in the examples above represent only a subset of possible embodiments, and are not to be considered limiting in terms of scope of the present disclosure.

More detailed discussions regarding possible embodiments of the methods and means inherent in the workflow depicted in FIG. 13 are provided subsequently. Specifically, the reader is referred to FIGS. 10, 11, 12, 14, and 15.

Figure 12:
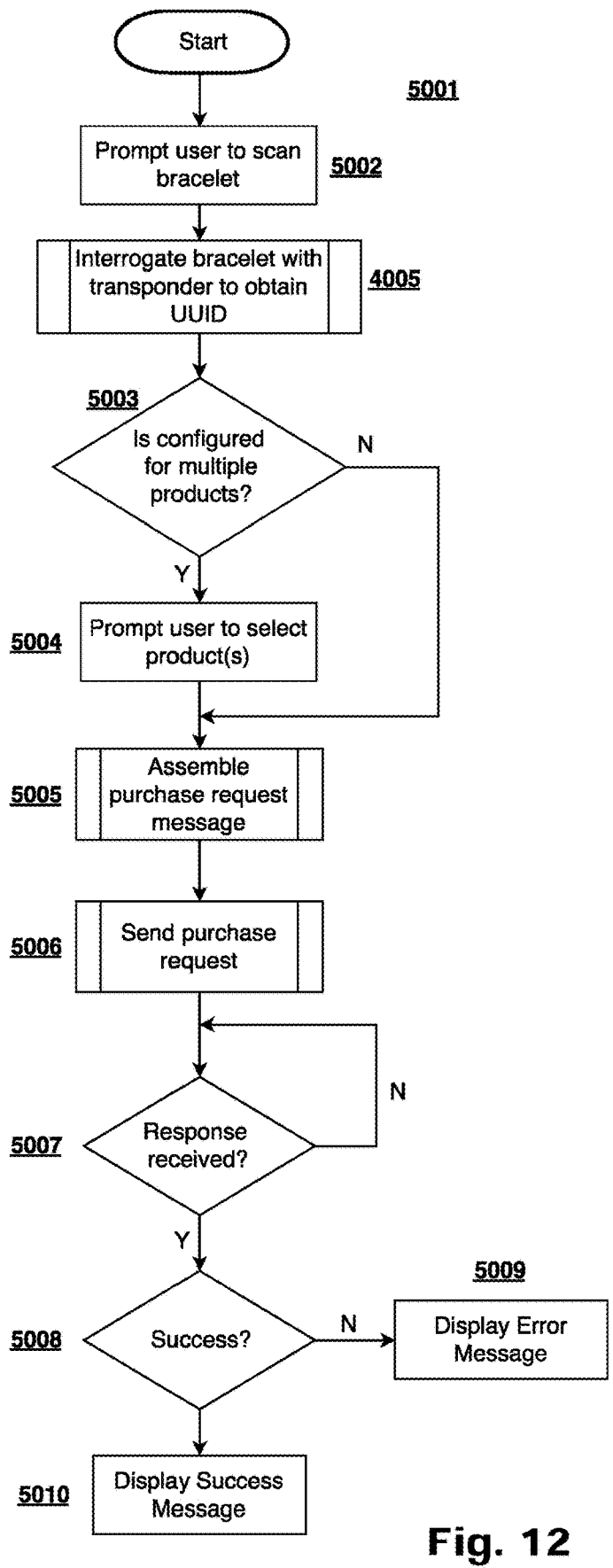
FIG. 12 illustrates a customer workflow when initiating a transaction request from a terminal device, using the wearable device associated with that customer for use within the facility, according to selected embodiments of the current disclosure.

Referring to FIG. 12, a customer undergoes the following process 5001 to initiate a transaction from a terminal device (1003) located in the facility. The user is promoted to scan a wearable device (5002). In one embodiment, upon the first interaction with the terminal device (1003) the display (2104) on the terminal device (1003) prompts the user to scan the wearable device (1002) using the attached RFID reader (1005). Once a successful scan has been recognized and the RFID tag number has been ascertained (i.e. an RFID proximity trigger event has been recognized), the terminal device advances to 5003. In another embodiment, this prompt may be displayed only, or again, after the desired products have been selected.

The process determines if there is a configuration for multiple products (5003). If the given terminal device is configured to allow the purchase of multiple products, the terminal device advances to 5004. Conversely, if the terminal is configured for only a single product, the terminal device advances to 5005.

The user is promoted to select products (5004). The user interface displays a list of products available for purchase or redemption at the given location, as defined by the configuration of the terminal device. The customer selects a plurality of products to purchase and confirms the selection from within the user interface. After confirmation, the terminal device advances to 5005 where it assembles a purchase request message (5005). The terminal device converts the selected product(s) into a request payload that contains the pertinent ProductIDs and value of the RFID tag number ascertained in 4005. The terminal device then advances to send a purchase request (5006). The terminal device sends a request payload to the server through the SWN containing the purchase request message derived in 5005, then advances to determine whether a response was received (5007). The terminal device then waits until a response has been received back from the server regarding the status of the purchase before advancing to determining whether the purchase was a success (5008). If the purchase status response returned by the server indicates that the purchase was successfully completed, the terminal device advances to 5010.

If the response indicates an error or that the purchase was otherwise unsuccessful, the terminal device displays an error message on the terminal device (5009). The user interface depicts the appropriate error and status message to the customer regarding the reason the transaction did not successfully process. The reason for failure is determined from within the main purchase workflow (4101).

If the response indicates success, the terminal device displays a message on the terminal device (5010). The user interface indicates to the user that the intended transaction has completed successfully.

Figure 10:
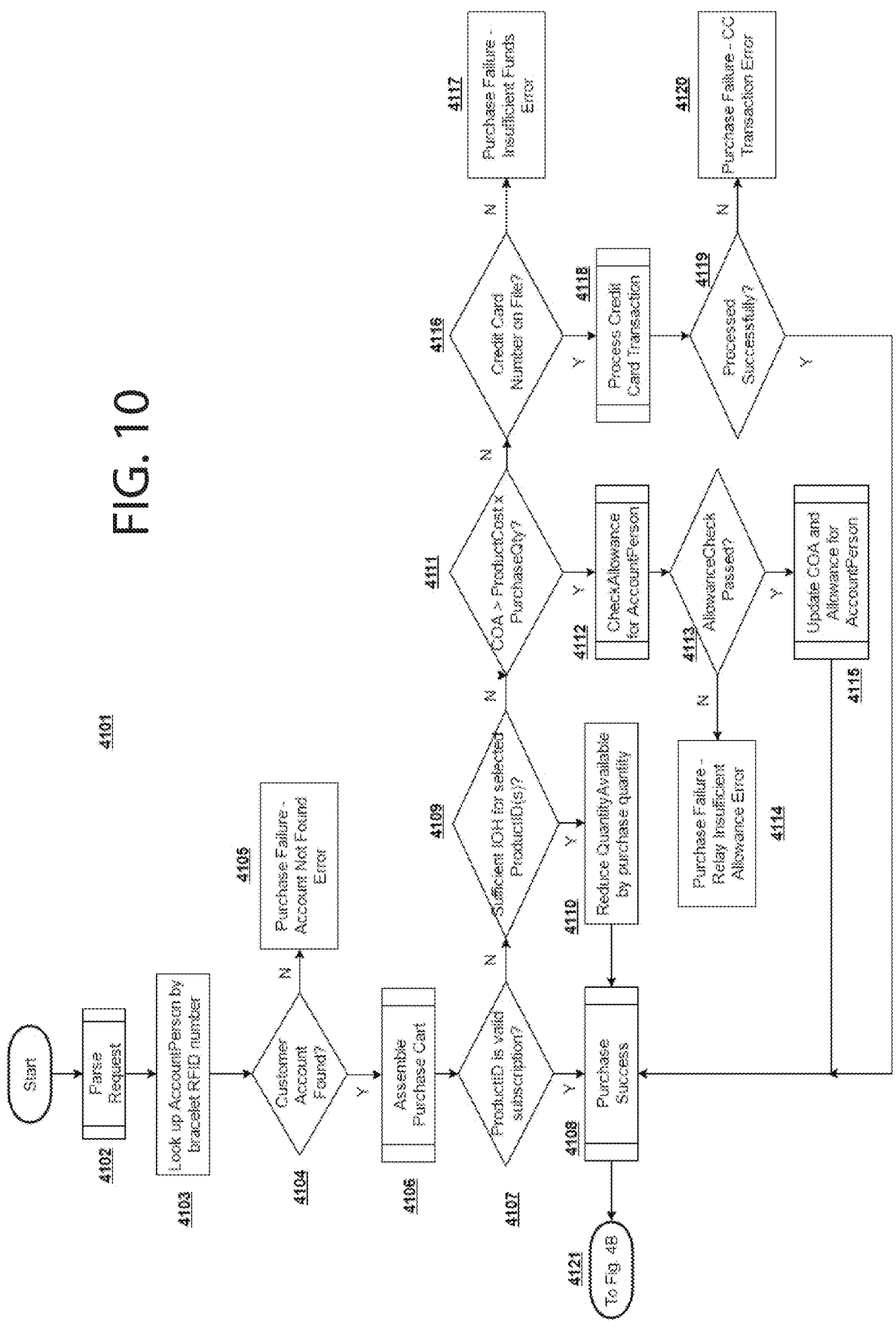
FIG. 10 illustrates a workflow to determine whether a purchase is valid based on the customer parameters according to selected embodiments of the current disclosure.

Referring to FIG. 10, the following customer purchase workflow and process (4101) begins once a request payload indicating a purchase request has been received by the server (1008). Parse Purchase Request (4102) when the terminal passes up RFID Tag Number that is associated with AccountPersonID to the server. The terminal can be preconfigured for the activity or station to know whether the customer (using the wearable device) is attempting to purchase time for a trampoline, laser tag, rock climbing, etc. Then, look up AccountPerson by wearable device RFID number (4103). The server identifies the person's account based upon the RFID tag number in the request payload identified in the request payload.

Next, it is determined if the customer account is found (4101). If the person has an account, then the server identifies the account from the request payload and advances to 4106. If the person does not have an account, then the server will send a response payload back to the terminal indicating an error (4105) and the terminal will indicate an error that no account was found. If a customer account tis found, assemble purchase cart (4106). Upon receiving and verifying account information from the customer, the server creates a purchase cart with the product being purchased, its price and quantity. In one embodiment, the server determines the product being purchased based on the configuration of the terminal that was passed to the server in the request payload (i.e., a terminal configured for laser tag will be configured to allow the purchase of additional time or rounds of laser tag).

Next, the process determines if the ProductID is a valid subscription product (4107). The server reviews the product ID from the cart and determines if the customer account attempting the transaction has a monthly or annual billing subscription. If it does not, then the server advances to determine if there is sufficient IOH for selected ProductID(s) (4109). If the customer account has a valid subscription, then the server creates a transaction object (i.e., a subscription transaction object), which includes a subscription identifier and advances to purchase success (4108) The server verifies the creation of a successful transaction object with the appropriate identifier and advances to 4121, shown in FIG. 11.

If the customer account has a pre-bought quantity (i.e., personal inventory) for the selected product that is greater than or equal to the quantity they are attempting to purchase, then the server advances to reduce IOH by purchase quantity (4110). The server deducts the requested quantity from the AccountPerson IOH and reflects a new IOH. The server creates a transaction object (i.e., a pre-bought transaction object), which includes a pre-bought identifier.

If the customer account has a balance (i.e., non-designated funds) that is greater than or equal to the total cost of the purchase cart (4111), then the server advances to check Allowance for AccountPerson 4112. If not, the server advances to determine if credit card number is on file (4116).

The server checks whether or not there is an allowance (i.e., purchase limit) associated with the account person, then the server advances to determine if allowance check passed (4113). The server checks if the remaining allowance (purchase limit) is greater than the amount of the purchase cart. If true, the server advances to update COA and allowance for AccountPerson (4115). If false, the server advances to Purchase Failure—Relay Insufficient Allowance Error (4114). If the amount of the purchase cart is greater than the remaining allowance, the server will send a response payload indicating an error that the remaining allowance is insufficient to complete the transaction.

To update COA and allowance for AccountPerson (4115), the server sends a notice to the responsible party that the purchase was within the allowance, the server then deducts the amount of the purchase cart from the account balance. The server then creates a transaction object (i.e., a COA transaction object), which includes a COA identifier and advances to 4108.

The server checks if there is a credit card number associated with that account (4116). If there is not a credit card available, the server advances to purchase failure for insufficient funds (4117). The server sends a response payload indicating an error and indicating that insufficient funds were available to complete the transaction. If a credit card is on file, the server advances to process the credit card transaction (4118). The server sends a request to complete the transaction using the credit card. The request can be handled by a 3rd-party processor via an API and the server will only need to be able to handle the pre-published responses from the processor to determine if the credit card succeeded or not. If the response from the credit card server indicates that the transaction was a success (4119), then the server creates a transaction object (i.e., a credit card transaction object), which includes a credit card identifier and advances to 4108. If the response from the credit card server indicates an unsuccessful transaction, the server advances to purchase failure (4120). The server sends a response payload indicating an error and indicating that the credit card transaction failed to process.

Figure 11:
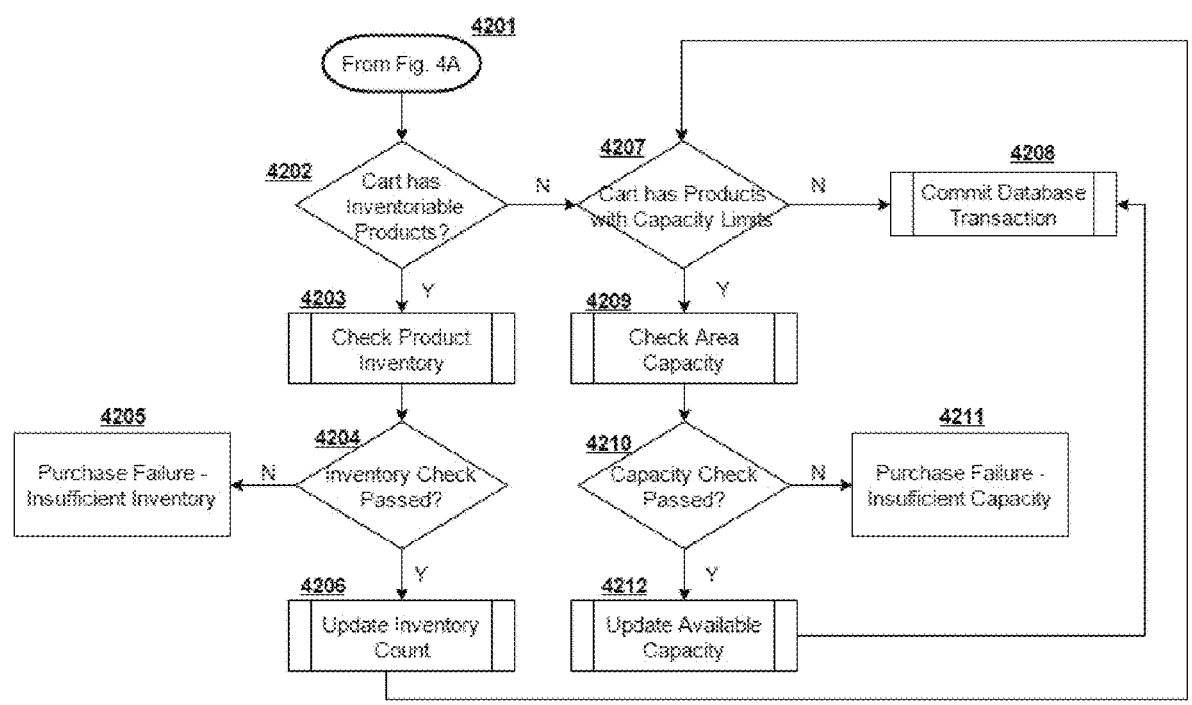
FIG. 11 illustrates secondary logic workflow conducted by the server to validate that the facility has sufficient inventory and/or capacity available to complete a desired purchase according to selected embodiments of the current disclosure.

Turning to FIG. 11, a park level workflow (4212) is shown. Following the completion of the workflow depicted in FIG. 10, the system must then determine if the facility has sufficient inventory and/or capacity available to complete the purchase as necessary. Starting at 4201, the server arrives here after completing the workflows contained within the 4100 block of figures. The server inspects the sales cart product items to determine if each product is tangible (i.e., does it have inventory) (4202). If the sales cart contains products that have inventory counts, the server advances to check product inventory (4203). The server retrieves the total inventory count for each product in the sales cart to determine the "amount available to sell". The server will count items "on hold" for another order if configured to do so based upon options defined per implementation.

The server compares the inventory counts retrieved from 4203 and determines if the inventory level is sufficient to sell the product(s) (4204). If so, the server advances to update inventory count (4206). If not, the server advances to purchase failure (4205). If the inventory count (i.e., product count available to sell) is not sufficient to complete the sale (i.e., the quantity in the cart is greater than the inventory on hand), the server will create a response with a failure message indicating that the inventory check failed.

To update inventory count (4206), the server deducts the requested quantity from the system's inventory count for each product and reflects the correct inventory for future transactions.

If the cart does not have inventoriable products, the server inspects the sales cart product items to determine if each product has a capacity limit (4207). If the sales cart contains products that have time-based capacity constraints (i.e., jump time, parties, laser tag, go carts), the server advances to check area capacity (4209). Using the products identified in step 4207, the server checks the availability and capacity of the given areas within the facility to determine if they are already booked or if they are at their capacity limit. In the ideal embodiment, any jump-time purchases are compared against the capacity constraint of the jump deck to ensure there are not too many jumpers. In the same contemplated embodiment, the server also checks to ensure the area within the facility is available based upon three levels of checks (1) is the facility available; (2) is the area available (i.e., not closed down); and (3) is the area already booked (if dealing with a product where booking is required).

If capacity check passed (4210), that is, if the area in question in step 4209 has sufficient capacity available for purchase (i.e., the total number of jumpers is less than or equal to the remaining capacity where capacity is the difference between all active tickets sold for a given area and the total capacity for an area) then the server advances to step 4212. If not, the server advances to purchase failure—insufficient capacity (4211). The server will provide a response message failure and end its current process if the capacity check from step 4210 failed.

If there is capacity, update available capacity (4212). The server can create tickets within the system for any type of product that requires a set start time and duration. The tickets are counted within a given timeslot in order to determine if capacity is available or not in step 4209.

Next, commit database transaction (4208). The server can commit, within a database transaction with the possibility of a rollback, the sales cart to persistent memory, the transaction to persistent memory, and process the transaction as necessary (i.e., charge a credit card). If credit card processing fails, the transaction will be updated with the failure message and have its status changed to "Failed" which causes it to be ignored in the rest of the system. Upon a failed credit card transaction, the server responds with a failed processing message. In some embodiments, following the above workflow outlined in FIG. 10 and FIG. 11, the server (1008) can construct and send a response payload to the appropriate endpoint, which may comprise the following information: (1) whether or not the transaction was a success, (2) if the transaction failed, an appropriate error message indicating the reason for failure and the corresponding parameters used to update the visual indicia (3108) located on the wearable device or display (2104) on the terminal device for the purpose of visually relaying that information to the customer, (3) if the transaction was a success, a success message and the corresponding parameters used to update the visual indicia (3108) located on the wearable device or display (2104) on the terminal device for the purpose of visually relaying that information to the customer.

Figure 14:
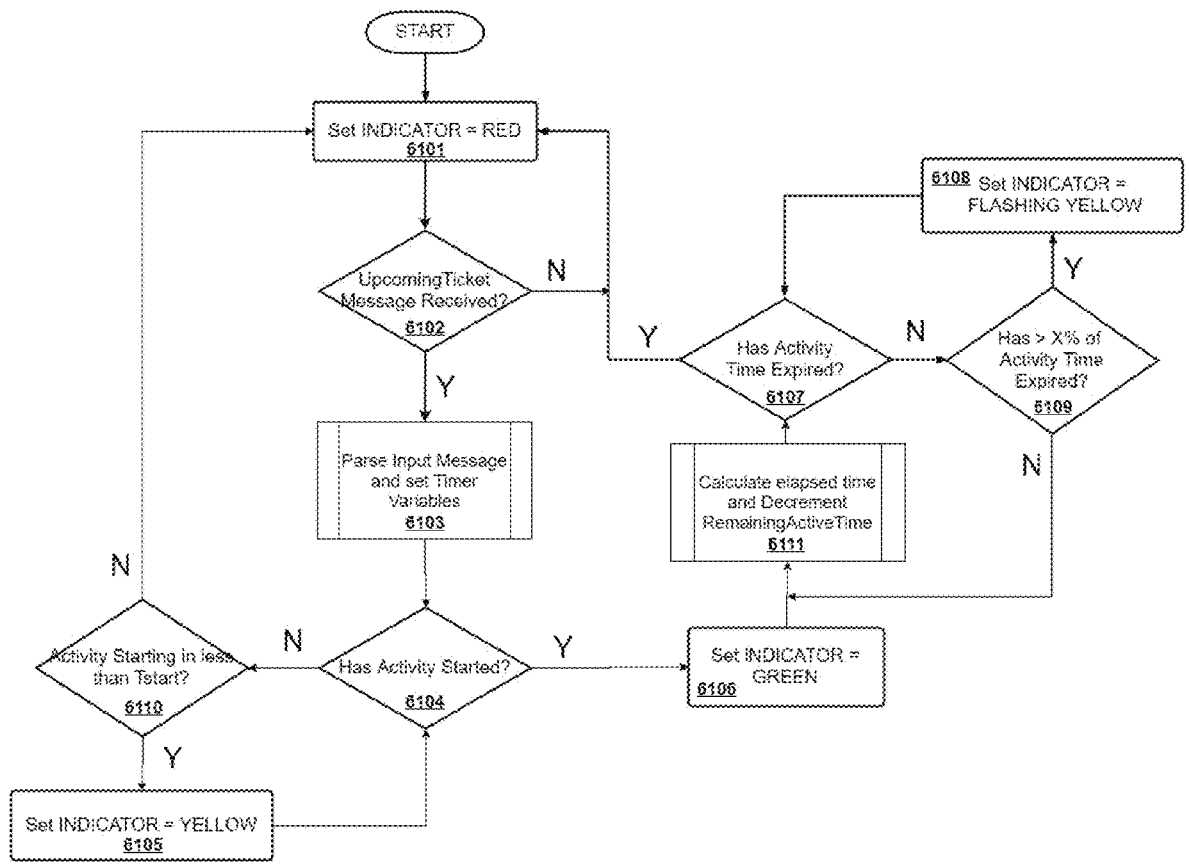
FIG. 14 illustrates a workflow whereby the wearable device can alter the state of its visual indicator in response to server response payload for the purpose of relaying status or other information to the wearer according to selected embodiments of the current disclosure.

In another aspect of the present invention, the wearable device(s) (1002) provide relevant status information regarding a customer's' status within the park as it pertains to previously purchased pass tickets and their validity. In one embodiment facility, employees can verify the status of a customer by viewing the indicator light on each customer's wearable device from 5 to 25 feet away. Referring to FIG. 14, this is achieved by altering the state of the visual indicia (3108) on the face of the wearable device (1002) via the following workflow (6100).

Upon initialization (i.e., the wearable device is turned on), the visual indicators (3108) on the wearable device are set to display that the customer is not currently expending a valid pass ticket (6101). In one embodiment, the LEDs (3109) and/or LCD screen (3110) are configured to display red to indicate this status. In another embodiment, the visual indicators (3108) may be set to display a different color or sequence of colors to convey this status. In still other embodiments, the LCD screen (3110) may display a text message or combination of colors and text, or any combination of the above embodiments. The wearable device then advances to determine if an upcoming ticket message has been received (6102). The wearable device checks for an incoming response payload from the gateway(s) (1102) regarding the status of previously purchased Pass Tickets by the customer. If no message is received, the wearable device advances to 6101. If a message was received indicating that an unredeemed pass ticket is associated with the Account-Person, the wearable device advances to parse input message and set timer variables (6103). The wearable device parses the Upcoming Ticket Message received from the server (1008) via the gateway(s) (1102) to first determine to which activity the ticket pertains (i.e., the trampoline jump deck, the rock wall, etc.). Additionally, in this process, the wearable device may set any or all of three internal timer variable states. This process is executed as follows: If the incoming Upcoming Ticket message contains a TimeActive parameter, the wearable device sets two internal variables (TotalTimeActive and RemainingTimeActive) to this value. Additionally, if the received message contains a non-zero value for TimeUntilStart (e.g., the ticket has a defined start time at which it can be used), the wearable device sets an internal variable (TimeUntilStart) to the value contained in the message. This variable represents the amount of time in milliseconds or seconds until the pass ticket should be activated, and it obviates the need for the individual wearable device to maintain real-time awareness relative to UTC. The wearable device then advances to determine whether the activity has started (6104).

The wearable device checks if the Activity has started (e.g., the product pass ticket has become valid) by checking the value of the TimeUntilStart variable. If TimeUntilStart is less than or equal to zero, this indicates that the product pass is now valid and the wearable device advances to 6106. If TimeUntilStart is greater than zero, the wearable device advances to 6110.

The wearable device changes the status of the visual indicators (3108) to indicate that a previously purchased pass ticket is about to become valid (6105). In one embodiment, the LED(s) (3109) on the face of the wearable device are set to display yellow. In other embodiments, the LEDs (3109) may be set to an alternative color or sequence of colors that is in some way different than the method used to convey the status defined in 6101. In yet another embodiment, the status may be relayed via other indicia such as displaying a text message vibrating or altering the color displayed on the LCD screen (3110), or any combination of the above.

The wearable device changes the status of the visual indicators (3108) to indicate that a previously purchased pass ticket is currently valid (6106). In one embodiment, the LED(s) (3109) on the face of the wearable device are set to display green. In other embodiments, the LEDs (3109) may be set to an alternative color or sequence of colors that is different than the colors used to convey the statuses defined in 6101 and 6105. In yet another embodiment, the status may be relayed via other indicia such as displaying a text message vibrating or altering the color displayed on the LCD screen (3110), or any combination of the above.

The wearable device checks the value of RemainingTimeActive to determine if the ticket has become invalid (e.g. the ticket has expired) (6107). If RemainingTimeActive<=0, this indicates that the pass ticket is no longer valid and the wearable device advances to 6101. If RemainingTimeActive>0, the pass ticket is still valid and the wearable device advances to 6109.

The wearable device changes the status of the visual indicators (3108) to indicate that a currently active pass ticket is about to expire (6108). In one embodiment, the LED(s) (3109) on the face of the wearable device are set to flash yellow on and off. In other embodiments, the LEDs (3109) can be set to an alternative color or sequence of colors that is different than the colors used to convey the statuses defined in 6101, 6105, and 6106. In yet another embodiment, the status can be relayed via other indicia such as displaying a text message vibrating or altering the color displayed on the LCD screen (3110), or any combination of the above.

The wearable device determines if the currently active pass ticket is about to expire by evaluating whether or not a certain percentage of the active time apportioned to the ticket has expired (6109). This is done by comparing the current value of RemainingTimeActive to TotalTimeActive. If this value indicates that greater than X % of the total valid time of the ticket has expired, the wearable device advances to 6108. If less than X % of the total valid time of the ticket has expired, the wearable device advances to 6111.

The wearable device determines if a previously purchased pass ticket is near to becoming valid (e.g., the start time for the ticket is coming up soon) by comparing the value of TimeUntilStart to a predetermined threshold Tstart (6110). If TimeUntilStart>Tstart, the wearable device advances to 6101. If TimeUntilStart<Tstart, the wearable device advances to 6105.

The wearable device calculates the amount of time in seconds or milliseconds that have elapsed since the last completed iteration of the logic loop (6100) and decrements the value of RemainingTimeActive by this amount (6111). The wearable device then advances to 6107.

Management of the display state on the visual indicators of the wearable device can be more further generalized in another embodiment of the present invention. Referring to TABLE 1 and FIG. 15, this can be achieved as follows. The server response payloads can contain a defined number of parameters that determine the state of the visual indicators (3108) on the wearable device (1003). Referring to TABLE 1, the parameters of each payload can include the following: (1) SecondsUntilStart—the number of seconds until the given state should be displayed. This is determined by the server at the time the message is sent. If the message pertains to a valid pass ticket that is to be redeemed at a scheduled start time, for example, this parameter is equal to the value of the time difference between the time the message is sent and the start time. If for example the payload pertains to an emergency message or a status update for the number of prize tickets, this value may be zero. (2) Message—the actual text of the message to be displayed in embodiments of the wearable device that contain an LCD screen (3110). (3) Style—how the visual indicators (3108) on the wearable device (1003) should display that state (i.e., blinking/flashing or a solid color), (4) Color—the primary color to display via the LEDs (3109), (5) SecondsDuration—the number of seconds to display that state, (6) Priority—the Priority of a message. This determines which state to display if multiple messages are in the queue simultaneously. An emergency message, for example, may need to be displayed immediately and override a display state indicating a valid pass ticket. This can be achieved by setting the Priority parameter message to a higher value than the current display state.

TABLE 1

| Seconds Until Start | Message | Style | Color | Duration (Seconds) |
|---|---|---|---|---|
| 300 | Go-Karts | Solid | Orange | 600 |
| 1500 | Trampoline Upcoming | Blinking | Green | 300 |
| 1800 | Trampoline Go | Solid | Green | 1800 |
| 0 | Emergency: See Front Desk | Blinking | Red | 99999 |

TABLE 1-continued

Figure 15:
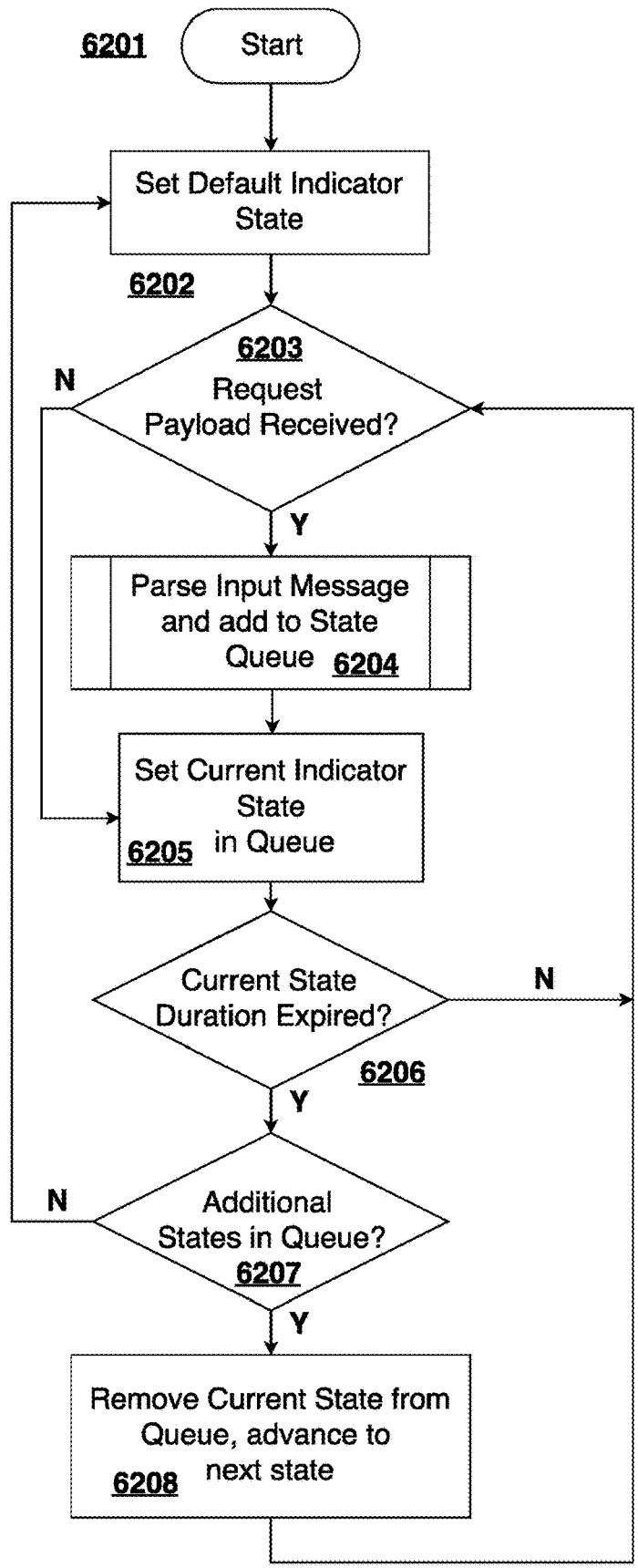
FIG. 15 illustrates a workflow for response payload handling from a server by the wearable device according to selected embodiments of the current disclosure.

In this embodiment, the wearable device manages multiple messages using a wearable device display indication state queue workflow (6201) outlined in FIG. 15. Initially (upon being checked out), the wearable device (1003) sets the display state of the visual indicators (3108) to a default state (i.e., red) (6202). The wearable device then advances to 6203 to check if a response payload (status data) has been received. If yes, the wearable device advances to 6204. Upon receiving an additional payload, the bracelet then parses the payload and adds it to the queue (6204) (TABLE 1). If not, the wearable device advances directly to 6205. The wearable device sets the internal timer variables and advances to 6205. In 6205, the wearable device sets the state of the visual indicators (3108) commensurate with the parameters defined by the current state in the queue (TABLE 1). If no state is present in the current queue, this state represents the default state in 6202. The wearable device then advances to 6206. In 6206, the wearable device checks the status of the internal timer variables to see if the current state has expired (DurationInSeconds, TABLE 1). If no, the device continues to display the current state and returns to 6203 to see if any additional request payloads have been received. If current state has expired, the wearable device advances to 6207. In 6207, the wearable device checks to see if there are additional states in the queue. If not, the wearable device advances to 6203 to again check for new received response payloads. If no, the device advances to 6205 and displays the default state (i.e., red) as described previously. If yes, the wearable device advances to 6208. In 6208, the wearable device removes the recently expired state from the queue and alters the state of the visual indicators (3108) to reflect the parameters defined by the current state of the queue.

Figure 16:
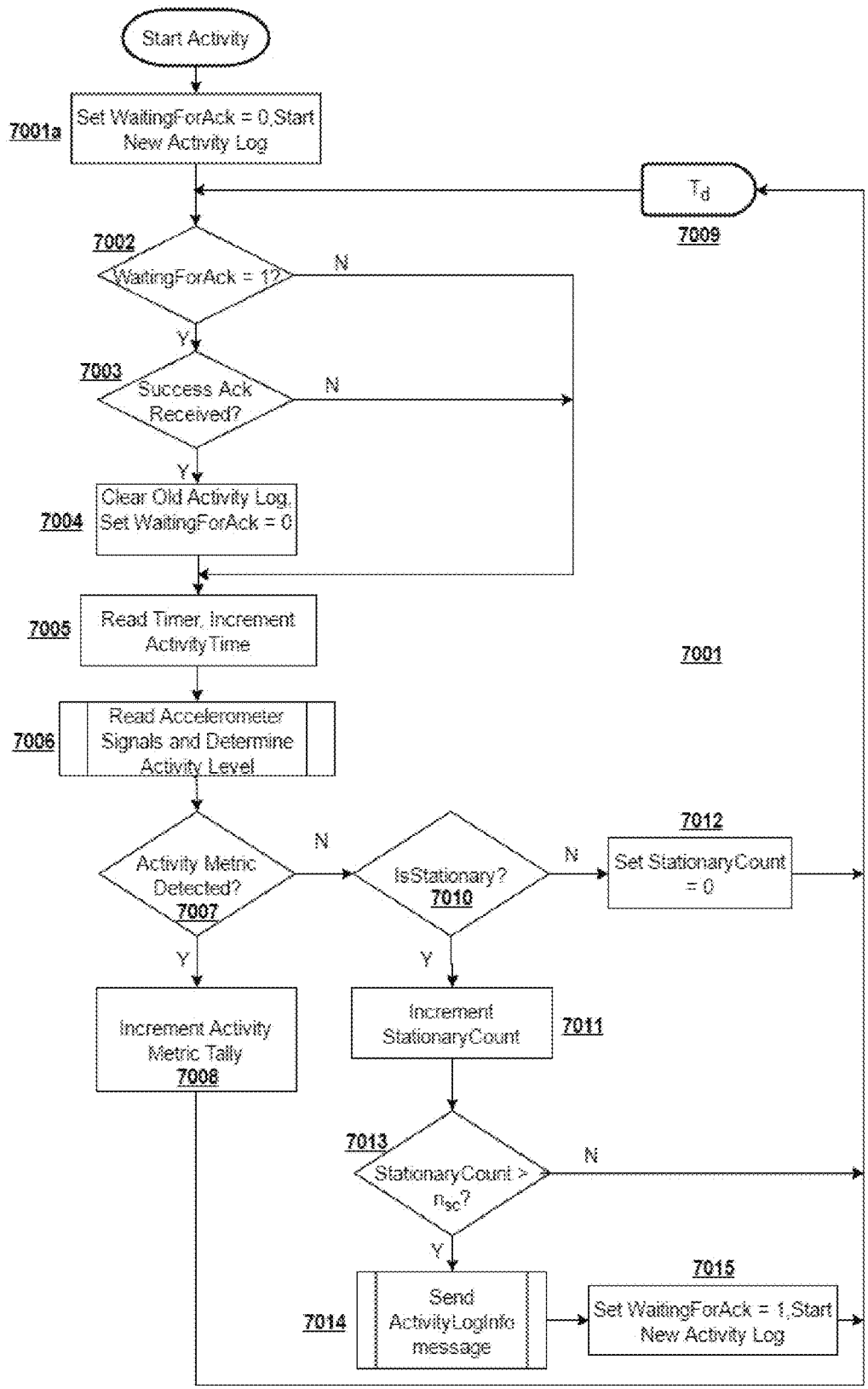
FIG. 16 illustrates a workflow to calculate activity metrics (i.e., 'gamify' activities) using measured acceleration signals according to selected embodiments of the current disclosure.

Still another aspect of the present invention is the ability to track defined activity metrics. In one embodiment, an activity metric can represent a distinct physical action or event, such as performing a jump on a trampoline. In another embodiment, an activity metric can include the amount of time spent or a number of times doing a particular activity. For convenience, activities or products for which an activity metric can be calculated or derived are collectively referred to as "gamified" activities. During said gamified activities, the wearable device records relevant data regarding the amount, intensity, or amount of time spent doing an activity as a means of deriving a 'score' proportional to these and other metrics. In one embodiment, this is achieved by temporarily logging aggregated activity data into an "Activity Log" and passing those data to the server (1008) through the WMN (1101) in a batch process. This process is described in FIG. 16 showing wristband activity logging (7001).

In one embodiment, the wearable device may calculate the total number of seconds or other unit of time spent performing a certain activity or consuming a certain attraction. For example, a customer may earn a point per 30 seconds jumping on the trampoline deck or climbing on the rock wall. In another embodiment, the wearable device may calculate a composite score based on algorithmic manipulation of the recorded motion or acceleration signals obtained from the accelerometer (3106) embedded in the wearable device. For example, a customer may receive a point for each jump recorded while jumping on the trampolines, and bonus points if a particularly high jump was performed. In one embodiment, these points may be equated to the aforementioned redemption tickets that are commonly found in such facilities.

Upon the beginning of the gamified activity (7001*a*), two actions take place. First, the WaitingForAck state is set to zero, indicating that the wearable device is not currently waiting for an acknowledgment message from the server. Secondly, the values in the Activity Log (i.e., the number of jumps, total time jumping, etc.) are reset to zero.

The wearable device checks whether or not it is currently waiting for an acknowledgment (7002) from the server that the last aggregated batch of activity information was successfully received, indicated by the internal WaitingForAck state. If Yes, the wearable device advances to 7003. If No, the wearable device advances to 7005.

The wearable device checks whether a successful acknowledgment message was received (7003) from the server (1008). If Yes, the wearable device advances to 7004. If No, the wearable device advances to 7005.

Figure 17:
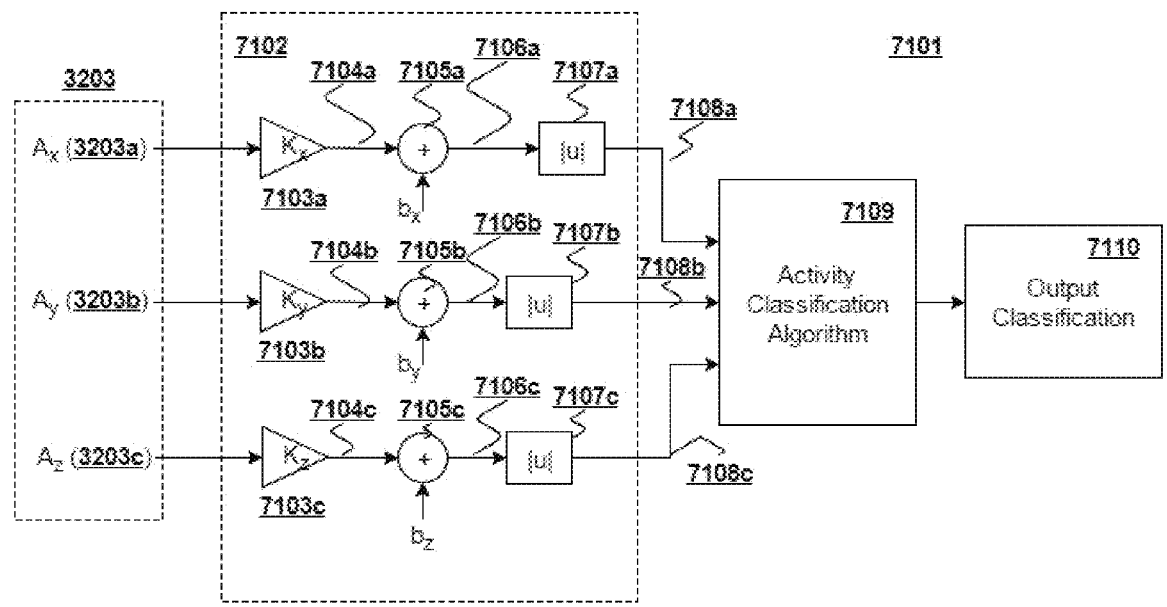
FIG. 17 is a block diagram representation of classification of activity levels using the measured acceleration values according to selected embodiments of the current disclosure.

After receiving a successful acknowledgment from the server indicating the last activity log was received, the data from the old Activity Log is removed and the WaitingForAck state is set to zero (7004). The wearable device then advances to read timer and increment activity time (7005). The wearable device microcontroller (3102) ascertains the amount of elapsed time between the current and previous sample based on the internal or external timer and increases the total Jump Time accrued in the current Activity Log by that amount. The wearable device then advances to read accelerometer signals and determine activity level (7006). The microcontroller executes a predefined procedure to ascertain the level of acceleration and determine whether the wearer is currently in the process of a jump via an activity classification algorithm (7101). Referring to FIG. 17, the process by which a wearable device determines whether an activity metric has been achieved is explained in further detail below. Upon completion of this subroutine, the wearable device advances to determine if activity metric detected (7007). If the output of the activity classification algorithm (7101) indicates that the wearer achieved a defined activity metric (i.e., performed a jump or flip), the wearable device advances to 7008. If an activity metric was not detected, the wearable device advances to 7010.

The wearable device increments the tally for the detected activity metric in the current Activity Log (7008) and advances to sample delay (7009). The microcontroller pauses for a configurable period of time (Td) before advancing to 7002.

Next, it is determined if the user was stationary (7010). If the output of the subroutine (7006) indicated that the user was stationary (i.e., not in the process of achieving an activity metric) the wearable device advances to 7011. If the response did not indicate that the user was stationary, the wearable device advances to 7012. The wearable device increments the StationaryCount (7011) variable by 1 and proceeds to 7013. The wearable device resets the StationaryCount (7012) variable to zero and proceeds to 7009.

If the StationaryCount variable is greater than a predetermined threshold nsc (7013), this indicates that the user has been stationary for a sufficient amount of time to send the current activity log to the server to be processed. If true, the wearable device advances to 7014. If false, the wearable device proceeds to 7009.

The wearable device parses the values in the current Activity Log to JSON format and sends an ActivityLogInfo message (7014) to the server through the wireless radio transponder (3103) contained within the wearable device (1002). The request is received by the gateways (1102) in the WMN (1101). After sending this request, the wearable device advances to 7015.

After the ActivityLogUpload request has been sent, the WaitingForAck state in the wearable device is set to 1 and subsequent activity is logged in a new Activity Log (7015). The prior Activity Log persists in memory until an Acknowledgment has been received (7003) to ensure the integrity of the Activity Log data. The wearable device then advances to 7009.

FIG. 17 shows the activity classification workflow (7101). Another aspect of the present disclosure is the ability of the wearable device (1002) to classify various activity metrics based on movement or location in the facility. As an example, this may be a detected jump while the customer is on the jump deck at a trampoline park or a successful completion of a rock wall or ropes course. An activity metric can be detected through a combination of the internal timing mechanisms provided by the wearable device MCU (1002) and the accelerometer (3106) embedded within the device. Further explanation of possible means of realizing this algorithm is detailed in 7109.

Acceleration signal preprocessing is indicated by reference 7102. In some embodiments, the MCU (3102) may precondition the filtered and/or conditioned acceleration or motion signals (3203) prior to implementing the jump detection algorithm (7109). These pre-processing steps may include the following steps.

Signal Gain for Ax (7103*a*): The MCU (3102) multiplies the filtered acceleration signal in the x-direction (3203*a*) by a factor Kx, producing a gain-modulated signal 7104*a*.

Gain-Modulated Signal Ax (7104*a*): The gain-modulated value of the measured acceleration in the x-direction, equivalent to Kx*Ax.

Signal Offset for Ax (7105*a*): The MCU (3102) applies a bias bx to signal 7104*a*, producing a gain- and offset-modulated signal 7106*a*.

Gain- and Offset-Modulated Signal Ax (7106*a*): The gain- and offset-modulated value of the measured acceleration in the x-direction, equivalent to (Kx*Ax)+bx.

Magnitude Calculation for Ax (7107*a*): The gain- and offset-modulated Ax signal is rectified to derive the magnitude of the signal 7106*a*.

Rectified and Conditioned Ax signal (7108*a*): The conditioned and rectified acceleration signal Ax, equivalent to 1(Kx*Ax)+bx1, to be used by the activity classification algorithm (7109).

Signal Gain for Ay (7103*b*): The MCU (3102) multiplies the filtered acceleration signal in the y-direction (3203*b*) by a factor Ky, producing a gain-modulated signal 7104*b*.

Gain-Modulated Signal Ay (7104*b*): The gain-modulated value of the measured acceleration in the y-direction, equivalent to Ky*Ay.

Signal Offset for Ay (7105*b*): The MCU (3102) applies a bias by to signal 7104*b*, producing a gain- and offset-modulated signal 7106*b*.

Gain- and Offset-Modulated Signal Ay (7106*b*): The gain- and offset-modulated value of the measured acceleration in the y-direction, equivalent to (Ky*Ay)+by.

Magnitude Calculation for Ay (7107*b*): The gain- and offset-modulated Ay signal is rectified to derive the magnitude of the signal 7106*b*.

Rectified and Conditioned Ay signal (7108*b*): The conditioned and rectified acceleration signal Ay, equivalent to 1(Ky*Ay)+byl, to be used by the activity classification algorithm (7109).

Signal Gain for Az (7103*c*): The MCU (3102) multiplies the filtered acceleration signal in the z-direction (3203*c*) by a factor Kz, producing a gain-modulated signal 7104*c*.

Gain-Modulated Signal Az (7104*c*): The gain-modulated value of the measured acceleration in the z-direction, equivalent to Kz*Az.

Signal Offset for Az (7105*c*): The MCU (3102) applies a bias bz to signal 7104*c*, producing a gain- and offset-modulated signal 7106*c*.

Gain- and Offset-Modulated Signal Az (7106*c*): The gain- and offset-modulated value of the measured acceleration in the x-direction, equivalent to (Kz*Az)+bz.

Magnitude Calculation for Az (7107*c*): The gain- and offset-modulated Az signal is rectified to derive the magnitude of the signal 7106*c*.

Rectified and Conditioned Az signal (7108*c*): The conditioned and rectified acceleration signal Az, equivalent to 1(Kz*Az)+bzl, to be used by the activity classification algorithm (7109).

The MCU (3102) ascertains the value of the conditioned motion signals and may perform various calculations or algorithms in an attempt to classify the recorded data as a recognized activity metric. The algorithm (7109) may analyze the recorded raw and/or preconditioned acceleration signals (7108*a,b,c*) to classify the recorded values into one of several predetermined metrics (i.e., a jump, a spin, a flip, etc.). The algorithm may implement additional digital filtering methods, cross-correlation functions, polynomial fitting, neural network classification, principal component analysis, state vector machines, other algorithms of a similar nature, or a combination or subset of the above.

If the results of the computations performed in 7109 indicate that an activity metric was achieved, the MCU outputs an appropriate value (7110) that corresponds to the detected activity metric, otherwise, the MCU outputs a value indicating that the user was stationary.

FIG. 18 shows a display view of a park 'leaderboard,' which prominently displays the most-active or highest-achieving customers within the facility over a period of time according to selected embodiments of the current disclosure. The leaderboard can display a plurality of statistics and activity metrics achieved by an individual, as well as composite score that is reflective of the cumulative activity metrics and statistics achieved by each person.

An additional provision of the present disclosure is the advent of a facility leaderboard' (8001) to complement the gamified activity tracking (7001) provided by the wearable devices (1002). The Leaderboard acts as a means of prominently displaying the most active or highest performing customers in the facility with the intent of encouraging further participation. As will be further explicated, the system calculates facility 'leaders' and ranks customers in accordance with the total number of activity metrics achieved by that individual. In one embodiment, the Leaderboard may display the following information:

Rank (8002): The 'rank' or 'place' of the customer relative to other persons registered in the system database (1009), which may be determined by a calculated 'Score' metric (8006).

Name (8003): The name of the customer in the AccountPerson record.

Total Jumps (8004): The cumulative number of jumps recorded to date.

Time Jumping (8005): The total time spent jumping to date.

Score (8006): A derived performance metric calculated using a combination of the activity metrics derived from the activity tracking functionality (7001) provided by the wearable devices (1002). In other embodiments, the Leaderboard display (8012) may also display additional activity metrics not listed above, or some combination or subset of the items listed above.

AccountPerson Rank (8007): The current rank of the AccountPerson (i.e., customer) relative to the other customers registered in the system AccountPerson Name (8008): The name of the customer attributed to that Rank in the Leaderboard.

Total Activity Metrics Achieved for AccountPerson (8009): In one embodiment, the cumulative number of activity metrics attributed to that AccountPerson (i.e., customer) to date. In another embodiment, within a configurable timeframe (i.e., the top-performing customers during the current month).

Total Time Spent Jumping for AccountPerson (8010): The cumulative amount of activity time attributed to that AccountPerson (i.e., customer) to date, or alternatively, within the leaderboard timeframe.

Calculated Score for AccountPerson (8011): The Calculated Score (8006) metric attributed to that AccountPerson.

Current 'leader' activity is portrayed via a large visual display (8012) that is highly visible within the facility. In one embodiment, the display may be comprised of a large LCD panel or series of panels such as the Clarity Matrix MX(c) offered by Planar, Inc. In another embodiment, the display may be comprised of one or a series of LED or OLED panels similar in nature to the aforementioned Clarity Matrix MX. In other embodiments still, the display may be comprised of a large LCD, OLED, or Plasma screen television or similar device. It is to be understood that possible manifestations of the Leaderboard display are not limited to the examples provided above, but still in other embodiments may take a form not explicitly listed above.

Figure 19:
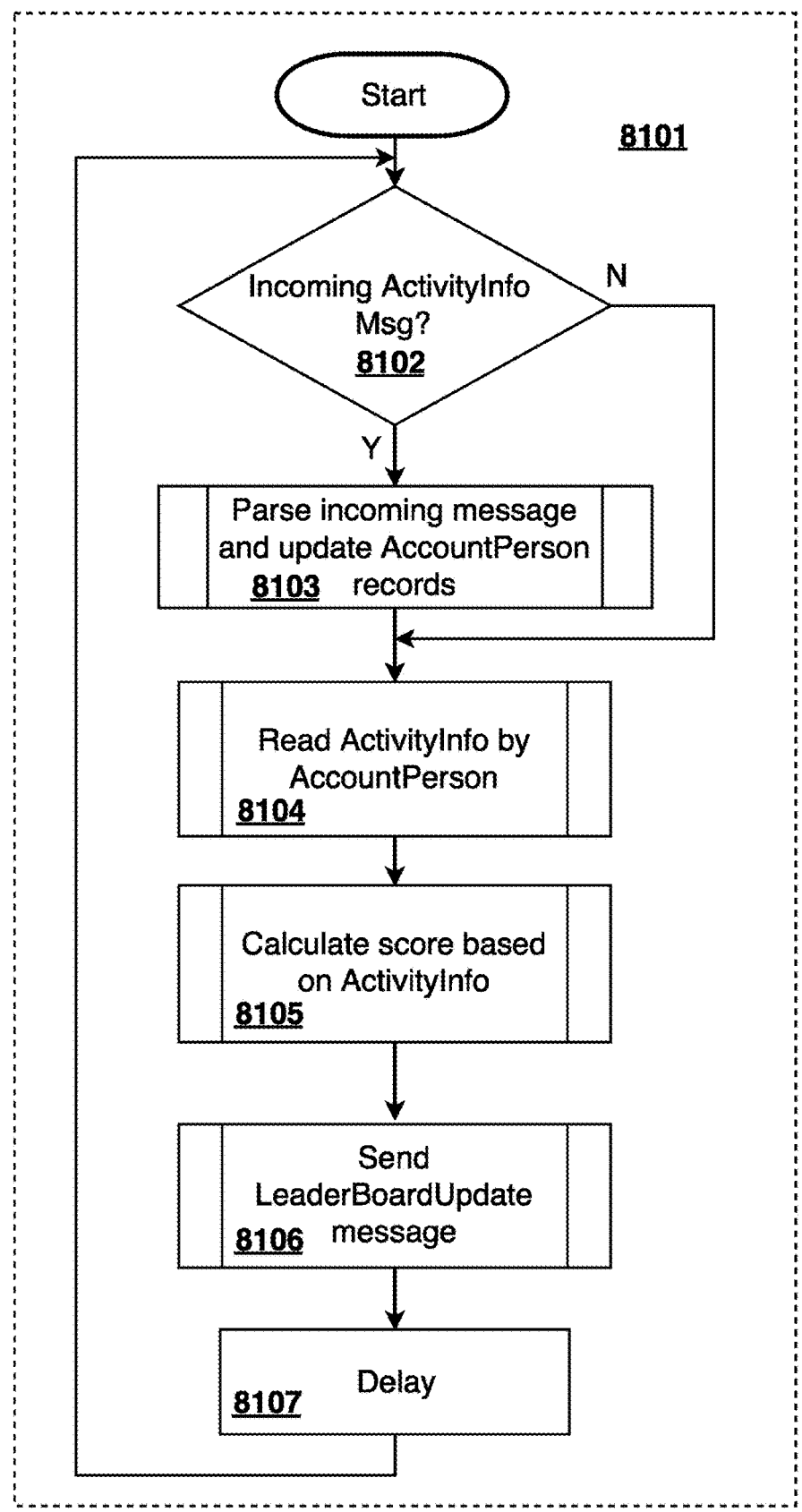
FIG. 19 illustrates a workflow of the server and leaderboard to update the leaderboard display according to selected embodiments of the current disclosure.

Referring to FIG. 19, a server-side leaderboard update workflow logic (8101) is shown. In one embodiment, the server (1008) runs a constant batch process that is responsible for keeping track of facility 'leaders', i.e., those customers who have accumulated the most activity while inside the facility. Within this process, the server (1008) handles incoming ActivityLogInfo request payloads (7014) received from the wearable devices (1002) as customers are participating in gamified activities.

The server (1008) checks to see if any new incoming ActivityInfo messages have been received (8102) since the last iteration of the Leaderboard update workflow (8101) was completed. If there are new unprocessed messages, the server advances to parse incoming message and update AccountPerson records (8103). The server parses the incoming ActivityInfo messages and increments the total accrued activity metrics (i.e., the total number of jumps, total time jumping) in the appropriate AccountPerson record by the values contained in the associated ActivityInfo message. If there are no new messages, the server advances to read ActivityInfo by AccountPerson (8104). The server (1008) sends a PWN request (1103) to obtain the cumulative ActivityInfo for all AccountPersons registered in the database (1009). The database responds with a PWN request containing the aggregated activity metrics for each AccountPerson (i.e., customer). Upon receiving the response from the database (1009), the server advances to calculate a score based on Activity Info (8105). The server derives a single calculated 'Score' for each customer based on the cumulative activity metrics achieved by that individual. In one embodiment, the score is directly proportional to a weighted sum of each activity metric. In another embodiment, the score may be derived through more advanced calculation methods, including higher order polynomial functions, implementing curving or normalization functions, or any combination or derivative thereof Once a 'Score' has been calculated for each AccountPerson, the server then assigns a rank to each customer (AccountPerson) such that the highest rank is assigned to the AccountPerson with the highest Score, the second highest rank is assigned to the customer with the second highest score, etc. The server then advances to send leaderboard update message (8106). The server (1008) then aggregates the results obtained from 8104 and 8105, including the AccountPerson name, the cumulative activity metrics achieved by each person, the final calculated Score for each customer, and their corresponding rank. The server (1008) then truncates the resultant dataset to include only those customers with rank N or better (i.e., the top ten customers with the highest calculated Score) and compiles this information into a payload message to send to the Leaderboard (8001). The server (1008) then sends the aforementioned message through the SWN gateways (1102) to the Leaderboard node. The server (1008) then advances to delay (8107). The server pauses for a finite amount of time before advancing to 8102 to reduce computational load.

Figure 20:
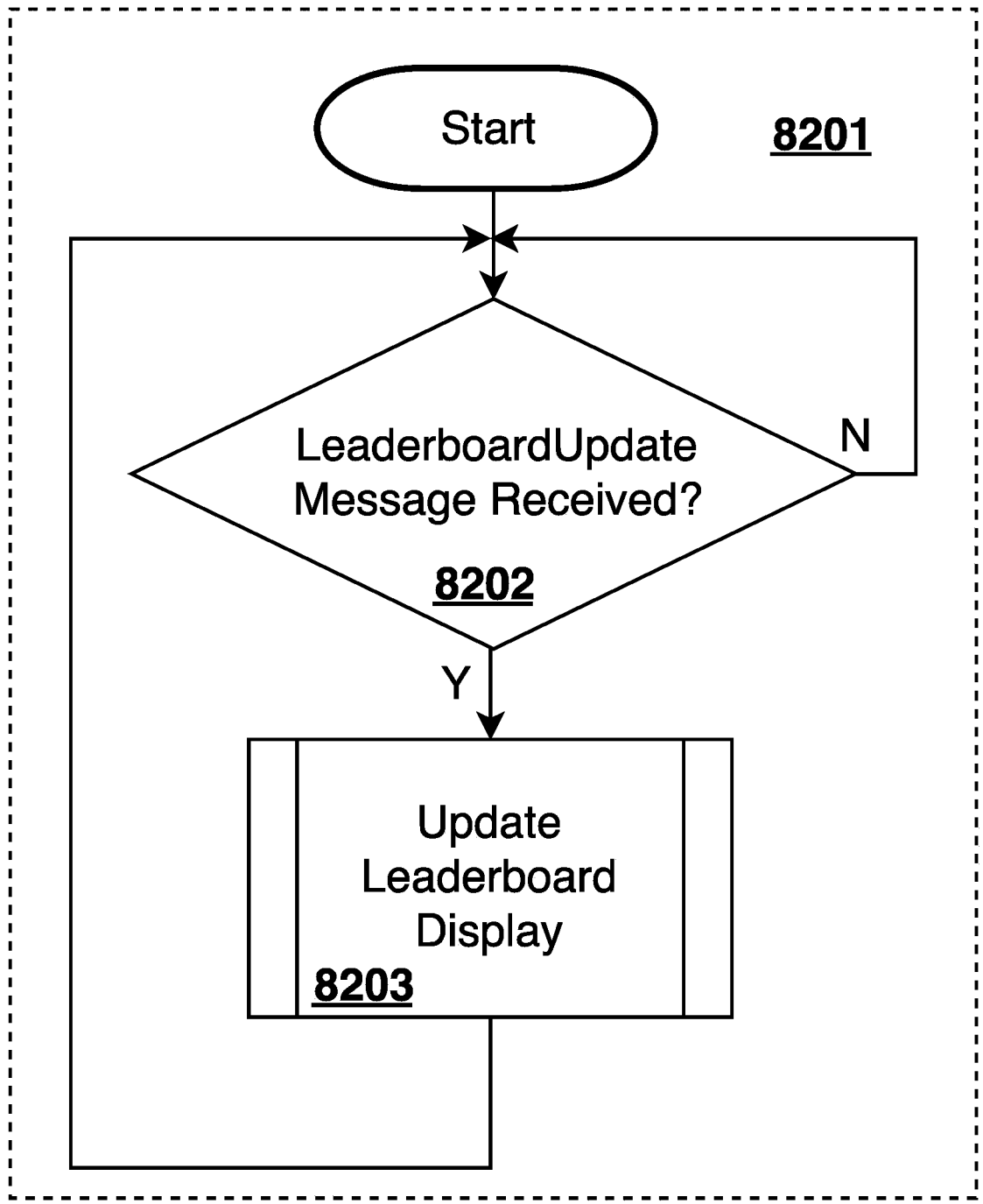
FIG. 20 illustrates a workflow of the server and leaderboard to update the leaderboard display according to other selected embodiments of the current disclosure.

Referring to FIG. 20, in one embodiment the Leaderboard may implement the following workflow to update the display as necessary (8201).

The Leaderboard node checks to see if an incoming LeaderboardUpdate message has been received (8202) through the SWN (1101). If no, the Leaderboard advances back to 8202. If yes, the Leaderboard advances to update leaderboard display (8203). The Leaderboard node parses the received LeaderboardUpdate message to partition the message into the Rank, total activity (i.e., the total number of jumps and total time jumped), and calculated Score for each AccountPerson (customer). The Leaderboard then updates the Leaderboard display (8012) to reflect the current 'leaders'. For each 'leader', the Leaderboard display (8012) may display the customers' Rank (8007), Name (8008), and calculated Score (8011). Additionally, the Leaderboard Display may also display the value of the total activity metrics achieved by each customer, for example, the total number of jumps achieved (8009) or total time spent jumping (8010). In another embodiment, the display (8012) may show additional metrics not listed in the current example case, such as maximum acceleration achieved, total steps taken within the park, total G forces experienced, etc. In yet another embodiment, the Leaderboard display (8012) may display a subset of the aforementioned data or additional metrics and pertinent customer data not explicitly listed above.

In another embodiment, the Leaderboard (8001) may also be connected to the PWN (e.g. if the Leaderboard is a Smart TV or LED/LCD panel, which are increasingly common in such facilities). In such an embodiment, the leaderboard may be realized by displaying a unique webpage that displays relevant Leader display information (see FIG. 18). In this embodiment, the Leaderboard can be updated via modifying the values displayed on the webpage via the server (1008).

In another aspect of the present invention, the same activity metrics determined via the wearable bracelets (see FIG. 16 and FIG. 17) can be consistently stored in the database for other purposes, such as marketing and analysis. A novel improvement offered by the current invention is the ability to record transactions across the facility via a single system. Accordingly, the system has access to all transaction information conducted day-to-day, along with the AccountPerson records associated with each transaction. In one embodiment of the current system, the server (1008) may implement additional processes or perform additional functions that allow the system to aggregate these data to determine which attractions are more popular, the used percentage of the total availability of a given attraction, and a plurality of other metrics of similar like.

In the foregoing description, it will be readily appreciated by those skilled in the art that modifications may be made to the invention without departing from the concepts disclosed herein. Such modifications are to be considered as included in the following claims unless the claims by their language expressly state otherwise.

In one embodiment, the system and device is an electronic ticketing and credit management device or system for a family entertainment center comprising: a transaction server communicating with a plurality of wearable electronic devices and a plurality of point of sale terminals, the transaction server managing quantity-based ticketing, time-based credits, and monetary-based credits exchangeable for either quantity-based tickets or time-based credits; each of the plurality of wearable electronic device communicating with the point of sale terminals to initiate a quantity-based, time-based, or monetary-based transaction; each of the plurality of wearable electronic devices further comprising a housing, including a wireless transceiver, a plurality of visual indicators, an accelerometer, an oscillator or other timer, and an RFID tag; each of the plurality of point of sale terminals, further comprising a housing, a visual display, a user interface, an RFID reader, and a transceiver; and the RFID reader at each of the plurality of point of sale terminals reading the RFID tag of each of the plurality of wearable electronic devices when the wearable electronic device is proximate to the point of sale terminal to initiate a transaction; the plurality of wearable electronic devices connecting to the transaction server through a secondary wireless network; and the plurality of point of sale terminals connecting to the transaction server via either a primary wireless network or a local area network.

In such an embodiment, the RFID reader of a point of sale terminal reads the RFID on a wearable electronic device, the point of sale terminal then transmits a payload to the transaction server via the primary wireless network or a local area network, the transaction server identifies an account associated with the payload and sends a payload back to the point of sale terminal via the primary wireless network or the local area network, and the transaction server sends a separate payload to the wearable electronic device via the secondary wireless network.

In one embodiment, the system or device further comprises a gateway receiving a payload from the primary wireless network and relaying the payload via the secondary wireless network to the wearable electronic device.

In one embodiment, the system or device further comprises a gateway receiving a payload from the wearable electronic device via the secondary wireless network and relaying the payload to the transaction server via the primary wireless network.

In one embodiment, the wearable electronic device displays a color indicator based on the payload received from the transaction server meaning a customer has sufficient credits for a time-based activity or a different color indicator meaning the customer does not have sufficient credits for a time-based activity.

In one embodiment, each of the plurality of wearable electronic devices measures movement using an accelerometer, each of the plurality of wearable electronic devices transmits movement data back to the transaction server via the secondary network, the transaction server determines the rank and activity data from each of the plurality of wearable devices, the transaction server sends a payload with rankings to a leaderboard, and the leaderboard displays the highest ranking or most active customers, as measured by each customer's wearable electronic device.

In one embodiment, at least one of the plurality of point of sale terminals communicates with the transaction server through the secondary wireless network.

While various embodiments of the present invention have been described above, it should be understood that they have been presented by way of example only, and not of limitation. Likewise, the various diagrams may depict an example architectural or other configuration for the invention, which is provided to aid in understanding the features and functionality that can be included in the invention. The invention is not restricted to the illustrated example architectures or configurations, but the desired features can be implemented using a variety of alternative architectures and configurations.

Indeed, it will be apparent to one of skill in the art how alternative functional configurations can be implemented to implement the desired features of the present invention. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

What is claimed is:

1. A networked system comprising
a plurality of wearable electronic devices, where each of the plurality of wearable electronic devices comprises a wireless network adapter, a timer, a visual indicator having a state, a wirelessly readable identification tag, and one or more processors executing programming logic;
a plurality of terminals, where each of the plurality of terminals comprises, a wireless identification tag data reader, a network adapter, and one or more processors executing programming logic; and
an apparatus comprising a network adapter and one or more processors executing programming logic;
where the programming logic of each of the plurality of the terminals is configured to:
receive identification data from each of the plurality of wearable electronic devices; and
send the identification data to the apparatus via the network adapter;
where the programming logic of the apparatus is configured to:
receive the identification data from one of the plurality of terminals via the network adapter of the apparatus;
determine an account associated with the identification data;
process a transaction associated to the determined account; send status data to the wearable electronic device via the network adapter of the apparatus;
where the programming logic of each of the plurality of wearable electronic devices is configured to:
receive status data from the apparatus via the respective network adapter of the respective wearable device;
wait a period of time; and
alter the state of the visual indicator of the respective wearable device.

2. The networked system of claim 1, wherein each of the plurality of wearable electronic devices further comprises movement sensor.

3. The networked system of claim 2, wherein the programming logic of each of the wearable electronic devices is further configured to: receive movement data from the movement sensor; and send the movement data to the apparatus via the network adapter of the respective wearable device.

4. The networked system of claim 3, wherein the programming logic of the apparatus is further configured to: receive movement data from at least one of the plurality of wearable devices via the networked adapter of the apparatus.

5. The networked system of claim 1, wherein the timer of each of the plurality of wearable electronic devices further comprises an oscillator.

6. The networked system of claim 1, wherein the timer of each of the plurality of wearable electronic devices is an oscillator.

7. The networked system of claim 1, wherein the programming logic of each of the plurality of wearable electronic devices is further configured to wait a period of time specified by the status data before altering the state of the visual indicator.

8. The networked system of claim 1, further comprising a primary network and a secondary network, where the secondary network is a wireless network; where the wireless network adapter of each of the plurality of wearable electronic devices communicates with the secondary network, where the network adapter of each of the plurality of terminals communicates with the primary network.

9. The networked system of claim 8, wherein the primary network is a wireless network.

10. The networked system of claim 8, wherein the network adapter of the apparatus communicates with the primary network.

11. The networked system of claim 1, wherein the network adapter of each of the plurality of terminals is a wireless network adapter.

12. The networked system of claim 1, wherein the apparatus is a plurality of computer servers.

13. The networked system of claim 1, wherein the state of the visual indicator of each of the plurality of wearable electronic devices is a color produced by the visual indicator.

14. The networked system of claim 1, wherein the state of the visual indicator of each of the plurality of wearable electronic devices is a liquid crystal display screen.

15. The networked system of claim 14, wherein the state of the visual indicator of each of the plurality of wearable electronic devices is a message displayed on the liquid crystal display screen.

16. The networked system of claim 1, wherein the programming logic of the apparatus is further configured to validate whether there is sufficient inventory or capacity to process the transaction.

17. The networked system of claim 1, further comprising a primary network, a secondary network, and a gateway, where the gateway relays data payloads from the primary network to the secondary network and from the secondary network to the primary network.

18. The networked system of claim 1, wherein the status data comprises a duration of time.

19. The networked system of claim 1, wherein the wirelessly readable identification tag is a radio-frequency identification tag.

20. The networked system of claim 1, wherein each of the plurality of terminals further comprises a visual display, where the programming logic of each terminal is further configured to receive response data from the apparatus via the primary network adapter and display a message through the visual display, and where the programming logic of the apparatus is further configured to send transaction data to one of the plurality of terminals via the network adapter of the apparatus.

21. A networked arrangement of devices comprising:
a plurality of wearable electronic devices, where each of the plurality of wearable electronic devices comprises a wireless network adapter, a visual indicator having a state, an accelerometer and a wirelessly readable identification tag, and one or more processors executing programming logic;
a plurality of terminals, where each of the plurality of terminals comprises a visual display, a user interface, an wireless identification tag data reader, a network adapter, and one or more processors executing processing logic;
a server system comprising a network adapter and one or more processors executing programming logic;
a primary network; and
a secondary network, where the secondary network is a wireless network;
where the wireless network adapter of each of the plurality of wearable electronic devices communicates with the secondary network, where the network adapter of each of the plurality of terminals communicates with the primary network;
where the programming logic of each of the plurality of terminals is configured to:
receive identification data from the wireless identification tags of the wearable electronic devices;
send the identification data to the server system via the network adapter;
receive transaction data from the server system via the network adapter; and
display a message through the visual display; where the programming logic of the server is configured to:
receive the identification data from one of the plurality of terminals via the network adapter of the server system;
determine an account associated with the identification data;
process a transaction associated with the determined account;
send the transaction data to one of the plurality of terminals via the network adapter of the server system;
send status data to the wearable device via the network adapter of the server system;
where the programming logic of each of the plurality of wearable devices is configured to:
receive status data from the server system via the respective network adapter of the respective wearable device; and
based on the status data alter the state of the visual indicator.

22. The networked arrangement of devices of claim 21, wherein the programming logic of each of the plurality of wearable devices is further configured to: receive movement data from the accelerometer; and send the movement data to the server system via the network adapter of the respective wearable device; and wherein the programming logic of the server system is further configured to: receive movement data from at least one of the plurality of wearable electronic devices via the networked adapter of the server system.

23. The networked arrangement of devices of claim 21, wherein the server system comprises a plurality of computer servers.

24. The networked arrangement of devices of claim 21, wherein the state of the visual indicator of each of the plurality of wearable electronic devices is a color produced by the visual indicator.

25. The networked arrangement of devices of claim 21, further comprising a gateway, where the gateway relays data payloads from the primary network to the secondary network and from the secondary network to the primary network.

26. A method of providing visual indication of permission for a user to access an area comprising the steps of:
reading identification data from a wearable device secured to a user, the wearable electronic device comprising a wireless network adapter, a timer, a visual indicator having a state, a wirelessly readable identification tag, and one or more processors executing programming logic;
receiving user input data from a user interface of a terminal;
sending the identification data from the wearable device and user input data from the terminal to a server system over a primary network;
determining an account associated with the identification data;
processing a transaction utilizing the user input data and the account;
sending status data to the wearable device over a secondary wireless network;
wait a period of time; and
altering a visual indicator of the wearable device to indicate permission to access an area.

27. The method of claim 26 further comprising the steps of: receiving movement data from the wearable device; calculating a score using the movement data from the wearable device; and displaying a ranking of users.

28. The method of claim 26, wherein the step of altering a visual indicator of the wearable device comprises displaying a message on a display screen of the wearable device.

29. A networked system comprising: a plurality of wearable electronic devices, where each of the plurality of wearable electronic devices comprises
a wireless network adapter, a timer, a visual indicator having a state, a wireless transponder, and one or more processors executing programming logic;
a plurality of terminals, where each of the plurality of terminals comprises a wireless data reader, a network adapter, and one or more processors executing programming logic; and an apparatus comprising a network adapter and one or more processors executing programming logic;
where the programming logic of each of the plurality of the terminals is configured to:
  receive identification data from each of the plurality of wearable electronic devices; and
  send the identification data to the apparatus via the network adapter;
where the programming logic of the apparatus is configured to:
  receive the identification data from one of the plurality of terminals via the network adapter of the apparatus;
  determine an account associated with the identification data; process a transaction associated to the determined account;
  send status data to the wearable electronic device via the network adapter of the apparatus;
where the programming logic of each of the plurality of wearable electronic devices is configured to:
  receive status data from the apparatus via the respective network adapter of the respective wearable device;
  wait a period of time; and
  alter the state of the visual indicator of the respective wearable device.

* * * * *